United States Patent
Adamek et al.

(10) Patent No.: US 8,021,455 B2
(45) Date of Patent: Sep. 20, 2011

(54) FILTER ELEMENT AND METHOD

(75) Inventors: Daniel E. Adamek, Bloomington, MN (US); Jan Cappuyns, Nossegem (BE); Egide Emmanuel Paul Baudry Moreau, Jodoigne (BE); Ming Ouyang, Roseville, MN (US); Robert M. Rogers, Minnetonka, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 55 days.

(21) Appl. No.: 12/035,150

(22) Filed: Feb. 21, 2008

(65) Prior Publication Data

US 2009/0044702 A1   Feb. 19, 2009

Related U.S. Application Data

(60) Provisional application No. 60/891,061, filed on Feb. 22, 2007.

(51) Int. Cl.
*B01D 59/50* (2006.01)
(52) U.S. Cl. ........... 55/486; 55/497; 55/488; 55/521; 55/527; 55/DIG. 5; 96/66; 96/67; 96/69; 95/287
(58) Field of Classification Search .......... 55/486, 55/527, 528, 524, 66, 521, 488, 497, DIG. 5, 55/DIG. 39; 95/287; 210/507, 508, 509; 442/342, 347, 348, 350; 96/66–67, 69, 15, 96/17; 162/141
See application file for complete search history.

(56) References Cited

U.S. PATENT DOCUMENTS

| | | |
|---|---|---|
| 2,764,602 A | 9/1956 | Ahlbrecht |
| 2,764,603 A | 9/1956 | Ahlbrecht |
| 2,801,706 A | 8/1957 | Asker |
| 2,803,656 A | 8/1957 | Ahlbrecht et al. |
| 3,073,735 A | 1/1963 | Till et al. |
| 3,147,064 A | 9/1964 | Brown et al. |
| 3,255,131 A | 6/1966 | Ahlbrecht et al. |
| 3,279,151 A | 10/1966 | Kauer, Jr. et al. |
| 3,303,621 A | 2/1967 | Hill |
| 3,450,755 A | 6/1969 | Ahlbrecht |
| 3,505,794 A | 4/1970 | Nutter et al. |

(Continued)

FOREIGN PATENT DOCUMENTS

DE   43 44 819   7/1994

(Continued)

OTHER PUBLICATIONS

Dahiya, A. et al., "Dry-Laid Nonwovens," http://www.engr.utk.edu/mse/pages/Textiles/Dry%20Laid%20Nonwovens.htm, 10 pages (Apr. 2004).

(Continued)

*Primary Examiner* — Jason M Greene
*Assistant Examiner* — Karla Hawkins
(74) *Attorney, Agent, or Firm* — Pauly, DeVries Smith & Deffner, L.L.C.

(57) ABSTRACT

A filter element having multiple formed layers of filtration media is disclosed. The media are layered so as to form a pore size gradient. The filter element is capable of removing both solid and liquid particulates from a moving fluid stream. The filter element has high strength and compressibility. The layers can be supported on a porous or perforate support to provide mechanical stability during filtering operations. The filtration media layers can be formed into various filter element forms such as panels, cartridges, inserts, and the like.

44 Claims, 9 Drawing Sheets

U.S. PATENT DOCUMENTS

| | | |
|---|---|---|
| 3,589,956 A | 6/1971 | Kranz et al. |
| 3,595,731 A | 7/1971 | Davies et al. |
| 3,616,160 A | 10/1971 | Wincklhofer et al. |
| 3,616,183 A | 10/1971 | Brayford et al. |
| 3,620,819 A | 11/1971 | Croce |
| 3,639,195 A | 2/1972 | Sanders |
| 3,653,181 A | 4/1972 | Becker |
| 3,705,480 A | 12/1972 | Wireman |
| 3,714,763 A | 2/1973 | Suzuki |
| 3,728,848 A | 4/1973 | Vest |
| 3,744,256 A | 7/1973 | Cobb et al. |
| 3,891,417 A | 6/1975 | Wade |
| 3,917,448 A | 11/1975 | Wood |
| 3,934,238 A | 1/1976 | Pavlov |
| 3,937,860 A | 2/1976 | Gusman et al. |
| 3,972,694 A | 8/1976 | Head |
| 3,998,988 A | 12/1976 | Shimomai et al. |
| 4,042,522 A | 8/1977 | Falk |
| 4,045,350 A | 8/1977 | Kupf et al. |
| 4,047,914 A | 9/1977 | Hansen et al. |
| 4,069,158 A | 1/1978 | Bertocchio et al. |
| 4,069,244 A | 1/1978 | Mueller |
| 4,079,675 A | 3/1978 | Beumel |
| 4,088,726 A | 5/1978 | Cunbers |
| 4,090,967 A | 5/1978 | Falk |
| 4,102,785 A | 7/1978 | Head et al. |
| 4,111,815 A | 9/1978 | Walker et al. |
| 4,160,059 A | 7/1979 | Samejima |
| 4,161,422 A | 7/1979 | Lawson et al. |
| 4,161,590 A | 7/1979 | Mueller |
| 4,161,602 A | 7/1979 | Mueller |
| 4,169,754 A | 10/1979 | Perrotta |
| 4,177,141 A | 12/1979 | Nakamura et al. |
| 4,189,338 A | 2/1980 | Ejima et al. |
| 4,210,540 A | 7/1980 | Perrotta |
| 4,211,819 A | 7/1980 | Kunimune et al. |
| 4,231,768 A | 11/1980 | Seibert et al. |
| 4,234,655 A | 11/1980 | Kunimune et al. |
| 4,239,278 A | 12/1980 | Skilliter |
| 4,239,516 A | 12/1980 | Klein |
| 4,254,731 A | 3/1981 | Taylor |
| 4,267,016 A | 5/1981 | Okazaki et al. |
| 4,269,888 A | 5/1981 | Ejima et al. |
| 4,272,318 A | 6/1981 | Walker et al. |
| 4,274,914 A | 6/1981 | Keith et al. |
| 4,309,475 A | 1/1982 | Hoffman, Jr. |
| 4,318,774 A | 3/1982 | Powell et al. |
| 4,321,108 A | 3/1982 | Goddard et al. |
| 4,327,936 A | 5/1982 | Sekiguchi |
| 4,370,152 A | 1/1983 | Luper |
| 4,388,086 A | 6/1983 | Bauer |
| 4,423,995 A | 1/1984 | Karis |
| 4,429,001 A | 1/1984 | Kolpin et al. |
| 4,443,233 A | 4/1984 | Moran |
| 4,457,974 A | 7/1984 | Summers |
| 4,487,617 A | 12/1984 | Dienes et al. |
| 4,500,384 A | 2/1985 | Tomioka et al. |
| 4,501,598 A | 2/1985 | Long |
| RE31,849 E | 3/1985 | Klein |
| 4,504,289 A | 3/1985 | Walker |
| 4,536,440 A | 8/1985 | Berg |
| 4,545,789 A | 10/1985 | Lato |
| 4,548,624 A | 10/1985 | Walker |
| 4,551,378 A | 11/1985 | Carey, Jr. |
| 4,552,603 A | 11/1985 | Harris, Jr. et al. |
| 4,555,430 A | 11/1985 | Mays |
| 4,579,774 A | 4/1986 | Kuwazuru et al. |
| 4,597,218 A | 7/1986 | Friemel et al. |
| 4,604,205 A | 8/1986 | Ayers |
| 4,610,678 A | 9/1986 | Weisman et al. |
| 4,627,863 A | 12/1986 | Klein |
| 4,657,804 A | 4/1987 | Mays et al. |
| 4,659,467 A | 4/1987 | Spearman |
| 4,661,132 A | 4/1987 | Thornton et al. |
| 4,676,807 A | 6/1987 | Miller |
| 4,677,929 A | 7/1987 | Harris |
| 4,681,801 A | 7/1987 | Eian et al. |
| 4,684,576 A | 8/1987 | Tabor et al. |
| 4,688,511 A | 8/1987 | Gerlach et al. |
| 4,689,057 A | 8/1987 | Gasper |
| 4,713,285 A | 12/1987 | Klein |
| 4,726,817 A | 2/1988 | Roger |
| 4,729,371 A | 3/1988 | Krueger et al. |
| 4,732,809 A | 3/1988 | Harris, Jr. et al. |
| 4,734,208 A | 3/1988 | Pall et al. |
| 4,764,189 A | 8/1988 | Yanagawa et al. |
| 4,765,812 A | 8/1988 | Homonoff et al. |
| 4,765,915 A | 8/1988 | Diehl |
| 4,807,619 A | 2/1989 | Dyrud et al. |
| 4,814,033 A | 3/1989 | Spearman et al. |
| 4,816,224 A | 3/1989 | Vogel et al. |
| 4,838,903 A | 6/1989 | Thomaides et al. |
| 4,838,905 A | 6/1989 | Billiet et al. |
| 4,840,838 A | 6/1989 | Wyss |
| 4,868,032 A | 9/1989 | Eian et al. |
| 4,874,666 A | 10/1989 | Kubo et al. |
| 4,886,058 A | 12/1989 | Brostrom et al. |
| 4,889,764 A | 12/1989 | Chenoweth et al. |
| 4,904,385 A | 2/1990 | Wessling et al. |
| 4,911,789 A | 3/1990 | Rieunier et al. |
| 4,917,714 A | 4/1990 | Kingsley, Jr. |
| 4,919,753 A | 4/1990 | Johnson et al. |
| 4,933,129 A | 6/1990 | Huykman |
| 4,983,434 A | 1/1991 | Sassa |
| 5,022,964 A | 6/1991 | Crane et al. |
| 5,027,781 A | 7/1991 | Lewis |
| 5,034,040 A | 7/1991 | Walcott |
| 5,042,468 A | 8/1991 | Lambert |
| 5,045,210 A | 9/1991 | Chen et al. |
| 5,057,368 A | 10/1991 | Largman et al. |
| 5,066,538 A | 11/1991 | Huykman |
| 5,068,141 A | 11/1991 | Kubo et al. |
| 5,080,791 A | 1/1992 | Sims |
| 5,082,476 A | 1/1992 | Kahlbaugh et al. |
| 5,087,278 A | 2/1992 | Suzuki |
| 5,089,119 A | 2/1992 | Day et al. |
| 5,092,911 A | 3/1992 | Williams |
| 5,104,537 A | 4/1992 | Stifelman et al. |
| 5,108,827 A | 4/1992 | Gessner |
| 5,110,330 A | 5/1992 | Loughron |
| 5,131,387 A | 7/1992 | French et al. |
| 5,147,553 A | 9/1992 | Waite |
| 5,147,721 A | 9/1992 | Baron et al. |
| 5,167,764 A | 12/1992 | Nielsen et al. |
| 5,167,765 A | 12/1992 | Nielsen et al. |
| 5,190,569 A | 3/1993 | McGrath |
| 5,190,812 A | 3/1993 | Joseph et al. |
| 5,208,098 A | 5/1993 | Stover |
| 5,212,131 A | 5/1993 | Belding |
| 5,246,474 A | 9/1993 | Greatorex |
| 5,246,772 A | 9/1993 | Manning |
| 5,275,743 A | 1/1994 | Miller et al. |
| 5,283,106 A | 2/1994 | Seller et al. |
| 5,284,704 A | 2/1994 | Kochesky et al. |
| 5,302,443 A | 4/1994 | Manning et al. |
| 5,307,796 A | 5/1994 | Kronzer et al. |
| 5,334,446 A | 8/1994 | Quantrille et al. |
| 5,336,286 A | 8/1994 | Alexander et al. |
| 5,354,603 A | 10/1994 | Errede et al. |
| 5,364,456 A | 11/1994 | Kahlbaugh et al. |
| 5,366,631 A | 11/1994 | Adiletta |
| 5,380,580 A | 1/1995 | Rogers et al. |
| 5,405,682 A | 4/1995 | Shawyer et al. |
| 5,415,676 A | 5/1995 | Tokar et al. |
| 5,436,980 A | 7/1995 | Weeks et al. |
| 5,454,945 A | 10/1995 | Spearman |
| 5,458,960 A | 10/1995 | Nieminen et al. |
| 5,468,572 A | 11/1995 | Zguris et al. |
| 5,472,467 A | 12/1995 | Pfeffer |
| 5,486,410 A | 1/1996 | Groeger et al. |
| 5,508,079 A | 4/1996 | Grant et al. |
| 5,508,093 A | 4/1996 | Mehdorn |
| 5,509,340 A | 4/1996 | Kawamura |
| 5,545,453 A | 8/1996 | Grant |
| 5,545,475 A | 8/1996 | Korleski |
| 5,575,832 A | 11/1996 | Boyd |
| 5,580,459 A | 12/1996 | Powers et al. |

| | | | | | | |
|---|---|---|---|---|---|---|
| 5,581,647 | A | 12/1996 | Onishi et al. | 6,165,572 A | 12/2000 | Kahlbaugh et al. |
| 5,584,784 | A | 12/1996 | Wu | 6,169,045 B1 | 1/2001 | Pike et al. |
| 5,597,645 | A | 1/1997 | Pike et al. | 6,171,355 B1 | 1/2001 | Gieseke et al. |
| 5,605,746 | A | 2/1997 | Groeger et al. | 6,171,369 B1 | 1/2001 | Schultink et al. |
| 5,607,735 | A | 3/1997 | Brown | 6,171,684 B1 | 1/2001 | Kahlbaugh et al. |
| 5,616,408 | A | 4/1997 | Oleszczuk et al. | 6,174,603 B1 | 1/2001 | Berger |
| 5,620,641 | A | 4/1997 | Berger | 6,183,536 B1 | 2/2001 | Schultink et al. |
| 5,620,785 | A | 4/1997 | Watt et al. | 6,186,992 B1 | 2/2001 | Roe et al. |
| 5,633,082 | A | 5/1997 | Berger | 6,187,073 B1 | 2/2001 | Gieseke et al. |
| 5,643,467 | A | 7/1997 | Romanco | 6,190,768 B1 | 2/2001 | Turley et al. |
| 5,643,653 | A | 7/1997 | Griesbach et al. | 6,197,709 B1 | 3/2001 | Tsai et al. |
| 5,645,057 | A | 7/1997 | Watt et al. | 6,200,669 B1 | 3/2001 | Marmon et al. |
| 5,645,689 | A | 7/1997 | Ruf et al. | 6,203,713 B1 | 3/2001 | Tanny |
| 5,645,690 | A | 7/1997 | Cox, Jr. | 6,241,886 B1 | 6/2001 | Kitagawa et al. |
| 5,662,728 | A | 9/1997 | Groeger | 6,251,224 B1 | 6/2001 | Dong |
| 5,665,235 | A | 9/1997 | Gildersleeve et al. | 6,264,044 B1 | 7/2001 | Meyering et al. |
| 5,667,562 | A | 9/1997 | Midkiff | 6,267,252 B1 | 7/2001 | Amsler |
| 5,672,399 | A | 9/1997 | Kahlbaugh et al. | 6,267,843 B1 | 7/2001 | Helwig et al. |
| 5,672,415 | A | 9/1997 | Sawyer et al. | 6,290,739 B1 | 9/2001 | Gieseke et al. |
| 5,677,058 | A | 10/1997 | Neal et al. | 6,300,261 B1 | 10/2001 | Young et al. |
| 5,679,042 | A | 10/1997 | Varona | 6,301,887 B1 | 10/2001 | Gorel et al. |
| 5,705,119 | A | 1/1998 | Takeuchi et al. | 6,306,539 B1 | 10/2001 | Zguris |
| 5,709,735 | A | 1/1998 | Midkiff et al. | 6,316,107 B1 | 11/2001 | Lubnin et al. |
| 5,711,878 | A | 1/1998 | Ogata et al. | 6,330,883 B1 | 12/2001 | Berger |
| 5,721,180 | A | 2/1998 | Pike et al. | 6,351,078 B1 | 2/2002 | Wang et al. |
| 5,728,187 | A | 3/1998 | Kern et al. | 6,352,947 B1 | 3/2002 | Haley et al. |
| 5,728,298 | A | 3/1998 | Hamlin | 6,355,076 B2 | 3/2002 | Gieseke et al. |
| 5,753,002 | A | 5/1998 | Glucksman | 6,355,079 B1 | 3/2002 | Sorvari et al. |
| 5,755,963 | A | 5/1998 | Sugiura et al. | 6,364,976 B2 | 4/2002 | Fletemier et al. |
| 5,779,847 | A | 7/1998 | Groeger | 6,365,001 B1 | 4/2002 | Helwig et al. |
| 5,783,505 | A | 7/1998 | Duckett | 6,372,004 B1 | 4/2002 | Schultink et al. |
| 5,785,725 | A | 7/1998 | Cusick et al. | 6,384,369 B1 | 5/2002 | Stenersen et al. |
| 5,792,711 | A | 8/1998 | Roberts | 6,406,789 B1 | 6/2002 | McDaniel et al. |
| 5,795,835 | A | 8/1998 | Bruner et al. | 6,409,785 B1 | 6/2002 | Smithies et al. |
| 5,800,586 | A | 9/1998 | Cusick et al. | 6,409,787 B1 | 6/2002 | Smithies et al. |
| 5,800,884 | A | 9/1998 | D'Anna et al. | 6,419,721 B1 | 7/2002 | Hunter |
| 5,804,286 | A | 9/1998 | Quantrille et al. | 6,419,839 B1 | 7/2002 | Cox et al. |
| 5,820,646 | A | 10/1998 | Gillingham et al. | 6,420,626 B1 | 7/2002 | Erspamer et al. |
| 5,837,627 | A | 11/1998 | Halabisky et al. | 6,428,610 B1 | 8/2002 | Tsai et al. |
| 5,840,245 | A | 11/1998 | Coombs et al. | 6,440,192 B2 | 8/2002 | Guerin et al. |
| 5,853,439 | A | 12/1998 | Gieseke et al. | 6,458,456 B1 | 10/2002 | Zainiev et al. |
| 5,885,390 | A | 3/1999 | Alkire et al. | 6,479,147 B2 | 11/2002 | Lubnin et al. |
| 5,911,213 | A | 6/1999 | Ahlborn et al. | 6,488,811 B1 | 12/2002 | Dong |
| 5,932,104 | A | 8/1999 | Kawamura | 6,495,286 B1 | 12/2002 | Zguris et al. |
| 5,935,879 | A | 8/1999 | Helwig et al. | 6,503,447 B1 | 1/2003 | Mondjian et al. |
| 5,935,883 | A | 8/1999 | Pike | 6,511,774 B1 | 1/2003 | Tsukuda et al. |
| 5,948,344 | A | 9/1999 | Cusick et al. | 6,517,612 B1 | 2/2003 | Crouch et al. |
| 5,952,252 | A | 9/1999 | Shawver et al. | 6,521,321 B2 | 2/2003 | Kahlbaugh et al. |
| 5,954,962 | A | 9/1999 | Adiletta | 6,528,439 B1 | 3/2003 | Stokes et al. |
| 5,965,468 | A | 10/1999 | Marmon et al. | 6,530,366 B2 | 3/2003 | Geiger et al. |
| 5,972,166 | A | 10/1999 | Helwig et al. | 6,530,969 B2 | 3/2003 | Gieseke et al. |
| 5,972,477 | A | 10/1999 | Kim et al. | 6,540,801 B2 | 4/2003 | Gieseke et al. |
| 5,976,998 | A | 11/1999 | Sandor et al. | 6,541,114 B2 | 4/2003 | Katou et al. |
| 5,981,410 | A | 11/1999 | Hansen et al. | 6,547,860 B2 | 4/2003 | Buchwald et al. |
| 5,989,432 | A | 11/1999 | Gildersleeve et al. | 6,555,489 B1 | 4/2003 | Pfeffer |
| 5,989,688 | A | 11/1999 | Barge et al. | 6,576,034 B2 | 6/2003 | Berger |
| 5,993,501 | A | 11/1999 | Cusick et al. | 6,607,997 B1 | 8/2003 | Cox et al. |
| 5,993,943 | A | 11/1999 | Bodaghi et al. | 6,613,704 B1 | 9/2003 | Arnold et al. |
| 6,007,608 | A | 12/1999 | Johnson | 6,616,723 B2 | 9/2003 | Berger |
| 6,007,898 | A | 12/1999 | Kim et al. | 6,624,099 B1 | 9/2003 | Shah |
| 6,013,587 | A | 1/2000 | Truong et al. | H2086 H | 10/2003 | Amsler |
| 6,024,782 | A | 2/2000 | Freund et al. | 6,645,388 B2 | 11/2003 | Sheikh-Ali |
| 6,041,782 | A | 3/2000 | Angadjivand et al. | 6,649,547 B1 | 11/2003 | Arnold et al. |
| 6,045,597 | A | 4/2000 | Choi | 6,652,614 B2 | 11/2003 | Gieseke et al. |
| 6,071,419 | A | 6/2000 | Beier et al. | 6,653,381 B2 | 11/2003 | Thames et al. |
| 6,071,641 | A | 6/2000 | Zguris et al. | 6,673,864 B2 | 1/2004 | Patel et al. |
| 6,077,391 | A | 6/2000 | Girondi | 6,682,576 B1 | 1/2004 | Kiyotani et al. |
| 6,099,726 | A | 8/2000 | Gembolis et al. | 6,682,809 B2 | 1/2004 | Van Rheenen |
| 6,103,181 | A | 8/2000 | Berger | 6,695,148 B2 | 2/2004 | Homonoff et al. |
| 6,103,643 | A | 8/2000 | Forsten | 6,705,270 B1 | 3/2004 | Rau et al. |
| 6,110,249 | A | 8/2000 | Medcalf et al. | 6,706,086 B2 | 3/2004 | Emig et al. |
| 6,136,058 | A | 10/2000 | Miller | 6,723,142 B2 | 4/2004 | Emerson et al. |
| 6,139,595 | A | 10/2000 | Herman et al. | 6,723,669 B1 | 4/2004 | Clark et al. |
| 6,143,049 | A | 11/2000 | Gieseke et al. | 6,740,142 B2 | 5/2004 | Buettner et al. |
| 6,143,441 | A | 11/2000 | Zguris | 6,743,273 B2 | 6/2004 | Chung et al. |
| 6,146,436 | A | 11/2000 | Hollingsworth et al. | 6,770,356 B2 | 8/2004 | O'Donnell et al. |
| 6,152,120 | A | 11/2000 | Julazadeh | 6,797,377 B1 | 9/2004 | DeLucia et al. |
| 6,156,682 | A | 12/2000 | Fletemier et al. | 6,815,383 B1 | 11/2004 | Arnold |
| 6,156,842 | A | 12/2000 | Hoenig et al. | 6,818,037 B2 | 11/2004 | Tamaka et al. |

| | | |
|---|---|---|
| 6,821,321 B2 | 11/2004 | Chinn et al. |
| 6,821,672 B2 | 11/2004 | Zguris |
| 6,835,311 B2 | 12/2004 | Koslow |
| 6,848,866 B1 | 2/2005 | McGinn |
| 6,849,330 B1 | 2/2005 | Morin et al. |
| 6,858,057 B2 | 2/2005 | Healey |
| 6,860,917 B2 | 3/2005 | Henrichsen et al. |
| 6,866,692 B2 | 3/2005 | Emerson et al. |
| 6,872,431 B2 | 3/2005 | Kahlbaugh et al. |
| 6,872,674 B2 | 3/2005 | Williams et al. |
| 6,874,641 B2 | 4/2005 | Clary |
| 6,875,249 B2 | 4/2005 | Gogins |
| 6,878,191 B2 | 4/2005 | Escaffre et al. |
| 6,883,321 B2 | 4/2005 | Fornof |
| 6,916,752 B2 | 7/2005 | Berrigan et al. |
| 6,923,182 B2 | 8/2005 | Angadjivand et al. |
| 6,924,028 B2 | 8/2005 | Chung et al. |
| 6,926,961 B2 | 8/2005 | Roth |
| 6,936,554 B1 | 8/2005 | Singer et al. |
| 6,939,386 B2 | 9/2005 | Sato et al. |
| 6,939,492 B2 | 9/2005 | Jackson et al. |
| 6,942,711 B2 | 9/2005 | Faulkner et al. |
| 6,955,708 B1 | 10/2005 | Julos et al. |
| 6,955,775 B2 | 10/2005 | Chung et al. |
| 6,966,940 B2 | 11/2005 | Krisko et al. |
| 6,991,113 B2 | 1/2006 | Nakajima |
| 7,008,144 B2 | 3/2006 | McGinn |
| 7,029,516 B2 | 4/2006 | Campbell et al. |
| 7,037,569 B2 | 5/2006 | Curro et al. |
| 7,049,254 B2 | 5/2006 | Bansal et al. |
| 7,070,640 B2 | 7/2006 | Chung et al. |
| 7,090,715 B2 | 8/2006 | Chung et al. |
| 7,094,270 B2 | 8/2006 | Schultink et al. |
| 7,115,150 B2 | 10/2006 | Johnson et al. |
| 7,125,470 B2 | 10/2006 | Graef et al. |
| 7,309,372 B2 | 12/2007 | Kahlbaugh et al. |
| 7,314,497 B2 | 1/2008 | Kahlbaugh et al. |
| 7,520,994 B2 | 4/2009 | Dong et al. |
| 2001/0000375 A1 | 4/2001 | Kobayashi et al. |
| 2002/0007167 A1 | 1/2002 | Dan et al. |
| 2002/0013111 A1 | 1/2002 | Dugan et al. |
| 2002/0083690 A1 | 7/2002 | Emig et al. |
| 2002/0116910 A1 | 8/2002 | Berger |
| 2002/0121194 A1 | 9/2002 | Buchwald et al. |
| 2002/0127939 A1 | 9/2002 | Hwo et al. |
| 2002/0193030 A1 | 12/2002 | Yao et al. |
| 2003/0008214 A1 | 1/2003 | Zguris |
| 2003/0019193 A1 | 1/2003 | Chinn et al. |
| 2003/0022575 A1 | 1/2003 | Yoneda et al. |
| 2003/0039815 A1 | 2/2003 | Roth |
| 2003/0082979 A1 | 5/2003 | Bean et al. |
| 2003/0084788 A1 | 5/2003 | Fraser, Jr. |
| 2003/0087568 A1 | 5/2003 | Kinn et al. |
| 2003/0089092 A1 | 5/2003 | Bause et al. |
| 2003/0096549 A1 | 5/2003 | Ortega et al. |
| 2003/0106294 A1 | 6/2003 | Chung et al. |
| 2003/0109190 A1 | 6/2003 | Geel |
| 2003/0139110 A1 | 7/2003 | Nagaoka et al. |
| 2003/0145569 A1 | 8/2003 | Sato et al. |
| 2003/0148691 A1 | 8/2003 | Pelham et al. |
| 2003/0150820 A1 | 8/2003 | Dussaud et al. |
| 2003/0211799 A1 | 11/2003 | Yao et al. |
| 2004/0116026 A1 | 6/2004 | Kubose et al. |
| 2004/0134355 A1 | 7/2004 | Kasmark, Jr. |
| 2004/0192141 A1 | 9/2004 | Yang et al. |
| 2004/0221436 A1 | 11/2004 | Ortega et al. |
| 2004/0242108 A1 | 12/2004 | Russell et al. |
| 2004/0255783 A1 | 12/2004 | Graham et al. |
| 2005/0026526 A1 | 2/2005 | Verdegan et al. |
| 2005/0109683 A1 | 5/2005 | Joyce et al. |
| 2005/0130031 A1 | 6/2005 | Zguris |
| 2005/0160711 A1 | 7/2005 | Yang |
| 2005/0210844 A1 | 9/2005 | Kahlbaugh et al. |
| 2005/0214188 A1 | 9/2005 | Rohrbach et al. |
| 2005/0233665 A1 | 10/2005 | Groten et al. |
| 2006/0009106 A1 | 1/2006 | Nishimura et al. |
| 2006/0094320 A1 | 5/2006 | Chen et al. |
| 2006/0096263 A1* | 5/2006 | Kahlbaugh et al. ............. 55/527 |
| 2006/0096932 A1 | 5/2006 | Dema et al. |
| 2006/0101796 A1 | 5/2006 | Kern et al. |
| 2006/0121811 A1 | 6/2006 | Mangold et al. |
| 2006/0137317 A1 | 6/2006 | Bryner et al. |
| 2006/0207932 A1 | 9/2006 | Hajek et al. |
| 2006/0230731 A1 | 10/2006 | Kalayci et al. |
| 2006/0242933 A1 | 11/2006 | Webb et al. |
| 2006/0266701 A1 | 11/2006 | Dickerson et al. |
| 2007/0039300 A1 | 2/2007 | Kahlbaugh et al. |
| 2007/0227359 A1 | 10/2007 | Choi |
| 2008/0073296 A1 | 3/2008 | Dema et al. |
| 2009/0044702 A1 | 2/2009 | Adamek et al. |
| 2009/0050578 A1 | 2/2009 | Israel et al. |
| 2009/0266759 A1 | 10/2009 | Green |

FOREIGN PATENT DOCUMENTS

| | | |
|---|---|---|
| EP | 0 340 763 | 11/1989 |
| EP | 0 451 554 A1 | 10/1991 |
| EP | 0 451 554 B1 | 10/1994 |
| EP | 0 465 203 | 3/1996 |
| EP | 1 036 585 | 9/2000 |
| EP | 1 118 632 B1 | 8/2001 |
| EP | 1 141 454 | 10/2001 |
| EP | 0 844 861 B1 | 3/2002 |
| EP | 1 378 283 | 7/2002 |
| EP | 1 179 673 A3 | 12/2002 |
| EP | 1 171 495 B1 | 3/2003 |
| GB | 1 532 076 | 11/1978 |
| WO | WO 97/41167 | 11/1997 |
| WO | WO 99/47211 | 9/1999 |
| WO | WO 01/03802 A1 | 1/2001 |
| WO | WO 02/45098 A2 | 6/2002 |
| WO | WO 03/080904 A2 | 10/2003 |
| WO | WO 2004/089509 A2 | 10/2004 |
| WO | WO 2005/120678 A1 | 12/2005 |
| WO | WO 2006/052656 A1 | 5/2006 |
| WO | WO 2006/052732 A2 | 5/2006 |
| WO | WO 2006/089063 A2 | 8/2006 |
| WO | WO 2009/088647 A1 | 7/2009 |

OTHER PUBLICATIONS

Hinds, W., *Aerosol Technology Properties, Behavior, and Measurement of Airborne Particles*, Second Edition, 3 pages (Copyright 1999).

"2.2 The Fourdrinier", http://www.paper.org.uk/papertech/data/unit_03/2_mechanical_methods/2-2_fourdrinier...., (Sep. 24, 2007) (7 pages).

"Filter Bag," Nonwovens Industry, vol. 23, No. 3, pp. 5 and 68 (Mar. 1992).

"Filtration—Daiwabo and Kyowa Jointly Produce Microfiber Filter," Nonwovens Markets, vol. 7, No. 4, p. 5 (Feb. 14, 1992).

"Three-Dimensional Structure Incorporates Heterofil Fibre and Carbon Beads," Nonwovens Report, International, No. 295, pp. 8-9 (Oct. 1995).

Donaldson Company brochure entitled "Cost Effective Emissions Solutions for Diesel Engines", 4 pages (2004).

Donaldson Company Torit® brochure entitled "HEPA & 95% DOP Panel Filters", 4 pages (2004).

European Search Report, EP 07119967.3, mailed May 6, 2008, 6 pages.

Hagewood, J., "Bicomponent Filtration: Variable Capacity Continuous Extended Area Filter," International Fiber Journal, vol. 14, No. 1, pp. 58-67 (Feb. 1998).

International Search Report mailed Mar. 23, 2006, PCT/US2005/039793 (11 pages).

International Search Report mailed Nov. 21, 2007, PCT/US2007/00963 (14 pages).

International Search Report mailed Aug. 29, 2008, PCT/US2008/054574 (11 pages).

Lennox-Kerr, "Advances in Textiles Technology," International Newsletters Ltd, UK, vol. 153, 3 pages (Sep. 2003).

Puurtinen, "Multilayering of Fine Paper With 30Layer Headbox and Roll and Blade Gap Former", Helsinki University of Technology, Laboratory of Paper Technology Reports, Series A19 (May 14, 2004) (54 pages).

Zhao, R., "An Investigation of Bicomponent Polypropylene/Poly-(ethylene Terephthalate) Melt Blown Microfiber Nonwovens, A Dissertation," Front Cover, pp. i-xix, pp. 1-207, 3 Information Pages (Dec. 2001).

File History for co-pending U.S. Appl. No. 10/982,538, filed Nov. 5, 2004, entitled "Filter Media and Structure" (280 pages).

File History for co-pending U.S. Appl. No. 11/986,377, filed Nov. 20, 2007, entitled "High Strength, High Capacity Filter Media and Structure" (197 pages).

File History for co-pending U.S. Appl. No. 11/381,010, filed May 1, 2006, entitled "Filter Medium and Breather Filter Structure" (141 pages).

File History for co-pending U.S. Appl. No. 12/036,022, filed Feb. 22, 2008, entitled "Formed Filter Element" (145 pages).

File History for co-pending U.S. Appl. No. 12/694,913, filed Jan. 27, 2010, entitled "Fibrous Media" (141 pages).

File History for co-pending U.S. Appl. No. 12/694,935, filed Jan. 27, 2010, entitled "Method and Apparatus for Forming a Fibrous Media" (138 pages).

\* cited by examiner

FILTER ELEMENT AND METHOD

CROSS REFERENCE TO RELATED APPLICATION

This application claims priority from provisional application Ser. No. 60/891,061, filed Feb. 22, 2007, and which is incorporated herein by reference.

FIELD OF THE INVENTION

The invention relates to a filter element formed by multiple layers of non-woven filter media of that is suitable for simultaneous solid and liquid particulate removal by virtue of high permeability, efficiency, loading capability, and other filtration parameters. The multiple layers of filter media are stacked so as to form a pore size gradient. The filter element is capable of removing both solid and liquid particulates from a moving fluid stream. The filter element has high strength and compressibility.

The invention relates to non-woven media layers that can survive challenging operating conditions, such as variation in flow rate, temperature, pressure and particulate loading while removing substantial particulate and aerosol loads from the fluid stream. The layers can be supported on a porous or perforate support to provide a filter structure.

BACKGROUND OF THE INVENTION

Non-woven webs for many end uses, including filtration media, have been manufactured for many years. Such structures can be made from bicomponent or core shell materials are disclosed in, for example, Wincklhofer et al., U.S. Pat. No. 3,616,160; Sanders, U.S. Pat. No. 3,639,195; Perrotta, U.S. Pat. No. 4,210,540; Gessner, U.S. Pat. No. 5,108,827; Nielsen et al., U.S. Pat. No. 5,167,764; Nielsen et al., U.S. Pat. No. 5,167,765; Powers et al., U.S. Pat. No. 5,580,459; Berger, U.S. Pat. No. 5,620,641; Hollingsworth et al., U.S. Pat. No. 6,146,436; Berger, U.S. Pat. No. 6,174,603; Dong, U.S. Pat. No. 6,251,224; Amsler, U.S. Pat. No. 6,267,252; Sorvari et al., U.S. Pat. No. 6,355,079; Hunter, U.S. Pat. No. 6,419,721; Cox et al., U.S. Pat. No. 6,419,839; Stokes et al., U.S. Pat. No. 6,528,439; Amsler, U.S. Pat. No. H2,086, U.S. Pat. No. 5,853,439; U.S. Pat. No. 6,171,355; U.S. Pat. No. 6,355,076; U.S. Pat. No. 6,143,049; U.S. Pat. No. 6,187,073; U.S. Pat. No. 6,290,739; and U.S. Pat. No. 6,540,801; U.S. Pat. No. 6,530,969; Chung et al., U.S. Pat. No. 6,743,273; Chung et al., U.S. Pat. No. 6,924,028; Chung et al., U.S. Pat. No. 6,955,775; Chung et al., U.S. Pat. No. 7,070,640; Chung et al., U.S. Pat. No. 7,090,715; and Chung et al., U.S. Patent Publication No. 2003/0106294. This application incorporates by reference U.S. Pat. No. 6,290,739, issued Sep. 18, 2001, and U.S. Pat. No. 6,143,049 issued Nov. 7, 2000. Such structures have been applied and made by both air laid and wet laid processing and have been used in fluid, both gaseous and air and aqueous and non-aqueous liquid filtration applications, with some degree of success.

Filter elements having pore size gradients are known in the prior art and are advantageous for particulate filtration where the filter otherwise can become clogged in the most upstream layers, thus shortening the lifetime of the filter. Varona, U.S. Pat. No. 5,679,042, discloses a filter having pore size gradient through a nonwoven web, wherein a thermoplastic nonwoven web is selectively contacted by a heating element so as to shrink the pores in selected areas. Alternatively, the filter element may have zones of different fibers such that each zone has an average set of fiber composition; the zones are exposed to heat that shrinks some fibers according to composition and denier, resulting in shrinking pore size and variable shrinkage depending on fiber composition in that zone. Amsler, U.S. Stat. Inv. Reg. No. H2086, discloses filter media for filtering particles from a liquid, wherein the filter is made with at least three layers of nonwovens: a first outer web of multicomponent fibers; a second outer web; and composite web of thermoplastic microfibers and 50% or more of a material such as pulp, polymeric staple fibers, particles, etc. The first (upstream) layer preferably has higher porosity, higher loft and is preferably constructed of crimped bicomponent spunbond fibers. Emig et al., U.S. Pat. No. 6,706,086, disclose a vacuum cleaner bag having a highly porous backing material ply and a filter material ply. The backing material is cellulose fibers and fusible fibers, that is wet laid or air laid and may also have glass fibers and/or synthetic fibers. There may be more than one backing material layer in the bag construction. The filter material is nonwoven that may be meltblown and may comprise nanofibers. The bag may have the layers loosely joined by a single seam.

Substantial prior art surrounding pore size gradients in filter elements is directed to heating, ventilating, or air conditioning (HVAC) applications. For example, Arnold et al., U.S. Pat. No. 6,649,547, disclose a nonwoven laminate suitable for use as a filter for HVAC applications. The laminate has a microfiber layer integrated with a high loft multicomponent spunbond layer on one side and a low-loft multicomponent spunbond fiber on the other side. Preferably, the layers are through-air bonded and electret treated. Pike et al., U.S. Pat. No. 5,721,180 disclose a laminate filter media for HVAC applications, where first layer is electret high loft, spunbond crimped fiber web of low density and a second layer is electret meltblown microfiber layer having at least one polyolefin. Cusick et al., U.S. Pat. Nos. 5,800,586; 5,948,344; and 5,993,501, disclose a pleated composite filter media having randomly oriented fibers for use in HVAC type applications, e.g. automobile cabin air filtration. One or more thin stiffening layers help the construction retain its pleated formation, but the stiffening layer may also aid in filtration of dirt from air. Preferably, the mean fiber diameter increases, and density decreases, over the thickness of the fibrous filtration layer. Schultink et al., U.S. Pat. Nos. 7,094,270; 6,372,004; and 6,183,536, disclose a multiple layer filter for HVAC type applications or vacuum cleaner bags. Layers of filter media are bonded together in a laminate. One embodiment has layers that by themselves are of such high porosity or are so flimsy they are useless by themselves. Some layers can have particles, etc. for filtering odors or toxins.

Another area of prior art surrounding filters with pore size gradients is in oily mist filtration. Johnson, U.S. Pat. No. 6,007,608 discloses a mist filter having at least three stages: prefilter, intermediate layer and last layer, all composed of polyester fibers. The intermediate layer is pleated. The prefilter purpose traps the bulk of high loadings of mist to prevent carryover by overloading of the pleated media. The multiple layers comprise a pore size gradient. Hunter, U.S. Pat. No. 6,419,721 discloses an oil mist filter for coalescing and draining oil. The filter is multiply layered, with at least a coalescing layer and a drainage layer. The layers are not bonded. The coalescing layer is made of microfibers; the draining layer is nonwoven material bonded by fusible fibers.

We have not found any filter elements that are suitable for use in heavy-duty engine filtration applications where very high levels of both solid and oily aerosol particulate are encountered. The prior art filters for e.g. diesel engines does not solve the problems presented by newer generation engines where the level of soot passed through the filter is much higher than engines of past generations.

Pressure-charged diesel engines generate "blow-by" gases, i.e., a flow of air-fuel mixture leaking past pistons from the combustion chambers. Such "blow-by gases" generally comprise a gas phase, for example air or combustion off gases, carrying therein: (a) hydrophobic fluid (e.g., oil including fuel aerosol) principally comprising 0.1-5.0 micron droplets (principally, by number); and, (b) carbon contaminant from combustion, typically comprising carbon particles, a majority of which are about 0.01 to 1.0 microns in size. Such "blow-by gases" are generally directed outwardly from the engine block, through a blow-by vent. Herein when the term "hydrophobic fluids" is used in reference to the entrained liquid aerosol in gas flow, the reference is to non-aqueous fluids, especially oils. Generally such materials are immiscible in water. Herein the term "gas" or variants thereof, used in connection with the carrier fluid, refers to air, combustion off gases, and other carrier gases for the aerosol. The gases may carry substantial amounts of other components. Such components may include, for example, copper, lead, silicone, aluminum, iron, chromium, sodium, molybdenum, tin, and other heavy metals.

Engines operating in such systems as trucks, farm machinery, boats, buses, and other systems generally comprising diesel engines, may have significant gas flows contaminated as described above. For example, flow rates can be about 2-50 cubic feet per minute (cfm), typically 5 to 10 cfm. In such an aerosol separator in for example a turbocharged diesel engine, air is taken to the engine through an air filter that cleans the air taken in from the atmosphere. A turbo pushes clean air into engine. The air undergoes compression and combustion by engaging with pistons and fuel. During the combustion process, the engine gives off blow-by gases.

In the past, diesel engine crankcase ventilation gases were directed into the atmosphere. New environmental restrictions in many countries now severely limit these emissions. One solution to handling this problem is to vent the valve cover to a filter element which collects the blow-by oil droplets generated in the engine from the cylinders and mist droplets generated by the action in the crank case and valve area. Blow-by is directed through the filter element, which traps the oily aerosols and allows the balance of the air stream to pass through. Collected oil then drains out of the element and back to the crankcase. The filtered air is directed upstream of the engine air compressor so that any oil that passes through the crankcase ventilation (CCV) filter element will be burned in the engine. Oil must be removed from this air to reduce or eliminate oil collection on the walls of the air cooler and to protect the various air sensors from fouling.

The life of the filter element is dependent on the amount of soot or other material that is collected and remains on the fibers in the filter media of the filter element. Typical engines have soot levels that are within the capabilities of the oil to remain in suspension (act like a liquid). However, recently diesel engines have been manufactured that generate excessive amounts of soot. One source of soot is the compressor which is driven by exhaust gas from the engine. A portion of this exhaust is directed into the lubrication oil (engine oil) and back to the crank case. Thus the exhaust gas, containing soot, is mixed with blow-by, substantially increasing the amount of soot in the blow-by. The soot collects on the fibers of the CCV filter element, eventually restricting flow. Due to the relatively small particle size of the soot, 0.01 to 0.1 microns, the soot tends to collects on the first few layers of a filter element. The life of the filter element is thereby severely reduced due to clogging of the first few layers of the filter media.

Aerosols in particular are challenging in filtration applications. The ability to achieve certain filtration attributes such as pore size, basis weight, thickness, permeability and efficiency are limited by the manufacturing techniques used to make the paper layers and by the components useful in such layers. Because aerosols may be as small as 1 nm diameter or as large as 1 mm (W. Hinds, Aerosol Technology: Properties, Behavior, and Measurement of Airborne Particles 8, $2^{nd}$ ed., © 1999 J. Wiley & Sons), conventional technologies are not suitably flexible to effectively accommodate the range of particle sizes in which aerosols may be encountered in fluid streams.

Some examples of conventional commercially available filtration media for the separation of aerosols, such as are present in blow-by, from air are products available from the Porous Media Company of St. Paul, Minn.; Keltec Technolab of Twinsburg, Ohio; ProPure Filtration Company of Tapei, Taiwan; Finite® and Balston® filters made by the Parker Hannifin Corporation of Mayfield, Ohio; Fai Filtri s.r.l. of Pontirolo Nuovo, Italy; Mann+Hummel Group of Ludwigsburg, Germany; and PSI Global Ltd. of Bowburn Durham, United Kingdom. However, none of these media are suitable for use in diesel engines where very high soot and oily aerosol loading is encountered in CCV filtration applications.

Thus, a substantial need exists for filtration media, filter elements, and filtration methods that can be used for removing multiple particulate materials from fluid streams, and in particular air streams. There is a substantial need for a filtration media, element, and method capable of filtration of high levels of both solid and liquid aerosol particulates from an air stream. The invention provides such media, filtration structures and methods and provides a unique media or media layer combinations that achieve improved permeability and long filtration life.

The variables toward which improvements are desired generally concern the following: (a) size/efficiency concerns; that is, a desire for good efficiency of separation while at the same time avoidance of a requirement for a large separator system; (b) cost/efficiency; that is, a desire for good or high efficiency without the requirement of substantially expensive systems; (c) versatility; that is, development of systems that can be adapted for a wide variety of shapes, applications, and uses, without significant re-engineering; and, (d) cleanability/ regeneratability; that is, development of systems which can be readily cleaned (or regenerated) if such becomes desired, after prolonged use.

BRIEF DESCRIPTION OF THE INVENTION

We have found a filter medium and filter element and a unique filter structure capable of efficiently removing heavy loadings of more than one type of particulate from a mobile fluid stream under a variety of harsh conditions. The medium of the invention combines high strength and excellent filtration properties with ease of manufacturing both the media and filter elements made from the media. The invention comprises a plurality of nonwoven, thermally bonded filter media, stacked in a housing to form a filter element. Filter media of the invention are made by incorporating substantial proportions of an organic or inorganic media fiber, a bicomponent thermoplastic binder fiber, optionally a resin binder, optionally a secondary fiber such as a thermoplastic fiber, and optionally other filtration materials.

The filtration media layers can be easily formed into various filter structures such as panels, cartridges, inserts, etc. This disclosure relates to media layers and to methods of filtration of gaseous streams wherein it is desirable to remove both solid and liquid particulate contaminants. Gaseous streams can include air, industrial waste gasses, crankcase gases, controlled atmosphere gases such as nitrogen, helium, argon, and the like. Liquid particulates can include water, fuels, oil, hydraulic fluid, emulsions or aerosols of hydrophobic or hydrophilic materials, volatile organic chemicals (VOCs), and the like. Solid particulates can include smoke, soot, powders such as talc, asbestos, carbon, and the like, including solid nanoparticles. The disclosure also relates to systems and methods for separating entrained particulate from the gas or liquid. Methods for conducting the separations are also provided.

As used herein, "filter medium" means a single layer of filter material; "filter element" is a stack of filter media of the invention; and "filter structure" denotes a filter element enclosed in a housing, between endcaps, on a support, or in any configuration wherein the filter element is useful in an end-use application. "Bicomponent fiber" means a thermoplastic fiber having at least one fiber portion with a melting point and a second thermoplastic portion with a lower melting point.

We have found a unique filter element structure capable of removing heavy loadings of at least two different kinds of particulate from a fluid stream.

The element comprises a plurality of thermally bonded sheet, media, or filter made by combining layers of different filter media having a substantial proportion of media fiber and a bicomponent thermoplastic binder fiber. The media can comprise glass fiber, a media fiber blend of differing fiber diameters, a binder resin and a bicomponent thermoplastic binder fiber. Such a media can be made with optional additional fibers and other additive materials. These components combine to form a high strength material having substantial flow capacity, permeability and high strength. The media of the invention can maintain intact filtration capacity at high pressure for a substantial period of time. The filter media operate at substantial flow rate, high capacity and substantial efficiency.

The media is then stacked in a plurality of layers to form the filter element of the invention, wherein at least two layers have different structures. As defined herein, "different" as it pertains to the filter media layers of the invention means filter media comprising different materials, different ratio of materials, different means of making the media, different chemical additives, or any other difference that gives rise to differences in surface energy of the fibers, pore size, permeability, loft, basis weight, pressure drop, tensile properties, fiber orientation, and the like. Media may be the same or different; in other words, several layers of one medium may be used, or a single layer of one medium may be used in a stacking arrangement to form the filter elements of the invention. Filter media may be made separately and combined later or simultaneously.

However, it should be noted that as used to describe matter trapped by the filters of the present invention, "different" means a difference in average particle size, particle shape, particle phase (liquid, solid, or gas), or chemical makeup of the material trapped by the filter elements of the invention.

By using different layers of filter media, filtration requirements that are seemingly opposed in terms of required filter structure can be resolved in a single filter element with ease. For example, in filtering a gaseous stream having a very high solid particulate loading, a filter with a gradient structure where the media fiber size and pores become smaller on the downstream side is useful. In other words, fiber size becomes smaller and the porous structure becomes continuously denser going from upstream to downstream side. As a result, the particles or contaminants to be filtered are able to penetrate to varying depths dependent on particle size. This causes the particles or contaminants to be distributed throughout the depth of the filter material, reducing the build up of pressure drop, and extending the life of the filter.

As with a filter that separates particulate, a filter separating oil or water mists out of gas streams it is advantageous to use a filter with a gradient structure where the media fiber diameter become small on the downstream side. In other words, the porous structure exhibits higher efficiency going from the upstream to downstream side. Generally, this results in greater fiber surface area in the downstream regions. Initially, the large, captured droplets are forced to come together and coalesce into larger droplets. At the same time, these downstream regions exhibit higher efficiency, capturing the most penetrating particles.

It is an advantage of the current invention that by varying layers using chemical parameters, physical parameters, or a combination of parameters, a filter element is formed that will efficiently entrap both a heavy loading of a solid particulate, such as soot, in addition to a liquid particulate, such as oily aerosol, from a fluid stream passing through it. Additionally, the filter element can be configured to facilitate coalescence and draining of a liquid aerosol from a gaseous stream.

A filtration element can comprise a plurality of layers of at least two different thermally bonded non-woven structures. The filter element may have a bilayer, trilayer or multilayer (4-20, 4-64 or 4-100 layers) of filtration media. Such layers can comprise a loading layer filtration media of the invention, and an efficiency layer filtration media of the invention or combinations thereof also combined with other filtration layers, support structures and other filter components.

A filter element can be easily manipulated for various applications. Because no special treatment of the layers of filter media is required, such as bonding layers together, the filter element of the present invention is simple to assemble. The filter media are easily cut to the desired shape, and may then simply be stacked together in a housing and/or secured with a support to form a filter structure.

A filter element can comprise a depth loading media that does not compress or tear when subjected to application conditions or conversion processes. Such media can have low solidity and high porosity, despite its robustness.

A filter element can be a composite of filtration media. One layer of preferred media is a sheet form from a wet laid process. It can be incorporated into filter arrangements, in a variety of ways, for example by a wrapping or coiling approach or by providing in a panel construction. Such filter media may be used to filter oily liquid particulates present at high loadings in crankcase gases. Another layer of preferred media is a sheet form from an air laid process. Such filter media may be made with higher loft and porosity than wet laid media, providing an ideal media for entrapping solid particulates such as soot when present at high levels in a fluid stream. According to the present disclosure, filter constructions for preferred uses to filter heavily soot- and oil-laden blow-by gases from engine crankcases are provided.

The invention comprises a method of filtering a mobile gaseous phase having high loadings of both solid and liquid particulate using the filtration elements of the invention. A preferred aspect of the invention comprises a method of filtering in diesel engine crankcase ventilation (CCV) applications.

The filter elements of the invention can be used in a variety of filter applications including pulse clean and non-pulse cleaned filters for dust collection, gas turbines and engine air intake or induction systems; gas turbine intake or induction systems, heavy duty engine intake or induction systems, light vehicle engine intake or induction systems; vehicle cabin air;

off road vehicle cabin air, disk drive air, photocopier-toner removal; HVAC filters in both commercial or residential filtration applications.

In general, the filter elements of the invention can be used to filter air and gas streams that often carry particulate material entrained therein. In many instances, removal of some or all of the particulate material from the stream is necessary for continued operations, comfort or aesthetics. For example, air intake streams to the cabins of motorized vehicles, to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because it can cause substantial damage to the internal workings to the various mechanisms involved. In other instances, production gases or off gases from industrial processes or engines may contain particulate material therein. Before such gases can be, or should be, discharged through downstream equipment or to the atmosphere, it may be desirable to obtain a substantial removal of particulate material from those streams.

The technology can also be applied to filtering liquid systems. In liquid filtering techniques, the collection mechanism is believed to be sieving when particles are removed through size exclusion. In a single layer the efficiency is that of the layer. The composite efficiency in a liquid application is limited by the efficiency of the single layer with the highest efficiency. The liquids would be directed through the media according to the invention, with particulates therein trapped in a sieving mechanism. In liquid filter systems, i.e. wherein the particulate material to be filtered is carried in a liquid, such applications include aqueous and non-aqueous and mixed aqueous/non-aqueous applications such as water streams, lube oil, hydraulic fluid, fuel filter systems or mist collectors. Aqueous streams include natural and man-made streams such as effluents, cooling water, process water, etc. Non-aqueous streams include gasoline, diesel fuel, petroleum and synthetic lubricants, hydraulic fluid and other ester based working fluids, cutting oils, food grade oil, etc. Mixed streams include dispersions comprising water in oil and oil in water compositions and aerosols comprising water and a non-aqueous component.

The media of the invention are most advantageously applied when more than one type of particle, or more than one size of a particle, are desirably captured by a single filter wherein a single filter media either cannot, or cannot efficiently, entrap all the materials. For example, where both small emulsion particles as well as large dirt particles are desirably removed from a water stream, the filter media of the invention would find particular utility. Using the filter media of the present invention, a filter element having filtration capability for all desired materials is easily assembled.

The medium of the invention is engineered to obtain a plurality of solidity, thickness, basis weight, fiber diameter, pore size, efficiency, permeability, tensile strength, and compressibility of the layers to obtain efficient filtration properties when used to filter a particular mobile stream. Solidity is the solid fiber volume divided by the total volume of the filter medium, usually expressed as a percentage. For example, the media used in filtering a dust-laden air stream can have a different solidity from a media used for filtering a water or oil aerosol from an air stream.

The filter elements of the present invention contemplate a plurality of solidity, thickness, basis weight, fiber diameter, pore size, efficiency, permeability, tensile strength, and compressibility of the layers so as to effectively entrap all the materials from a given fluid stream efficiently. Thus, dust as well as oil aerosol filtration by a single filter element is contemplated by the invention. Each application of the technology of the invention obtains from a certain set of operating parameters as discussed below.

In a particularly preferred embodiment of the present invention, a filter element is constructed having extremely high porosity, high loft, and low solidity in the most upstream layer. This allows soot from a highly soot-laden stream to be efficiently trapped without clogging the filter element. This layer is also relatively thick compared to layers used to trap oil aerosol, providing for distribution of the soot into the depth of the lofty layer and thereby increasing the filter element life. Increasing the fiber size and distance between fibers tends to increase the capacity of each layer. To optimize the element's capacity, a series of layers can be constructed, upstream to downstream, so that the soot is collected evenly in each layer. Downstream layers are comprised of filter media having lower loft and porosity, engineered to trap and drain liquid particulates. Thus, a stream heavily laden with both soot and oily aerosol particulates is advantageously filtered using a single filter element.

To accomplish this, the current invention contemplates a layered filter element with two, three, or more layers, wherein each layer or group of layers can comprise different filter media. The layers or groups of layers have progressively smaller pore sizes from the upstream side to the downstream side. Ideally, each layer is different to form a gradient arrangement to effectively filter a wide range of particle sizes without clogging so as to maximize the useful life of the filter structure. However, practicality and economy will typically necessitate restriction of the number of different layers. Economically, several layers of the same filter media may be stacked on top of the other, such that the filter element may have 50 layers but only 3 different layer compositions.

The filter elements of the invention employ bicomponent fibers. The use of the bicomponent fiber enables the formation of a filter media with no separate resin binder or with minimal amounts of a resin binder. It is desirable to substantially eliminate the use of binder, because binders form films, which in turn reduces the total pore volume, and reduces filter medium uniformity due to migration of the resin to a particular location of the filter media layer, i.e. by melting when heated or by glassy polymer flow under gravity. The use of the bicomponent fiber therefore results in reduced compression, improved solidity, increased tensile strength and improved utilization of other fibers such as glass fiber and other fine fiber materials added to the media layer or filter element. Further, the bicomponent fiber provides improved processability during furnish formulation, sheet or layer formation and downstream processing including thickness adjustment, drying, cutting and filter element formation. These components combine in various proportions to form a high strength filter medium having substantial filtration capacity, permeability and filtration lifetime. The filter media of the invention can maintain, intact, filtration capacity for substantial periods of time at substantial flow rates and with substantial efficiency.

The media of the invention may additionally employ media fibers. Media fibers include a broad variety of fibers having the correct diameter, length and aspect ratio for use in filtration applications. One preferred media fiber is a glass fiber. A substantial proportion of glass fiber can be used in the manufacture of the media of the invention. The glass fiber provides pore size control and cooperates with the other fibers in the media to obtain a media of substantial flow rate, high capacity, substantial efficiency and high wet strength. The term glass fiber "source" means a glass fiber composition characterized by an average diameter and aspect ratio that is made available as a distinct raw material. Blends of one or more of such sources do not read on single sources.

We have found that by blending various proportions of bicomponent and media fiber in the filter media layers of the present invention that excellent strength and filtration properties can be obtained. Further, blending various fiber diameters can result in enhanced properties when layers are stacked. A combination of wet laid or dry laid processes can be used to make the various layers of the filter elements of the invention. In making the media of the invention, a fiber mat is formed using either wet or dry processing of a combination of bicomponent fiber and media fiber. The mat is then heated to melt thermoplastic materials to form the media by adhering the fibers. The bicomponent fiber used in the media of the invention permits the fiber to fuse into a mechanically stable sheet, media, or filter. The bicomponent fiber having a thermally bonding exterior sheath causes the bicomponent fiber to bind with other bicomponent fibers and with media fibers in the filter media layer.

DETAILED DESCRIPTION OF THE INVENTION

Figure 1:
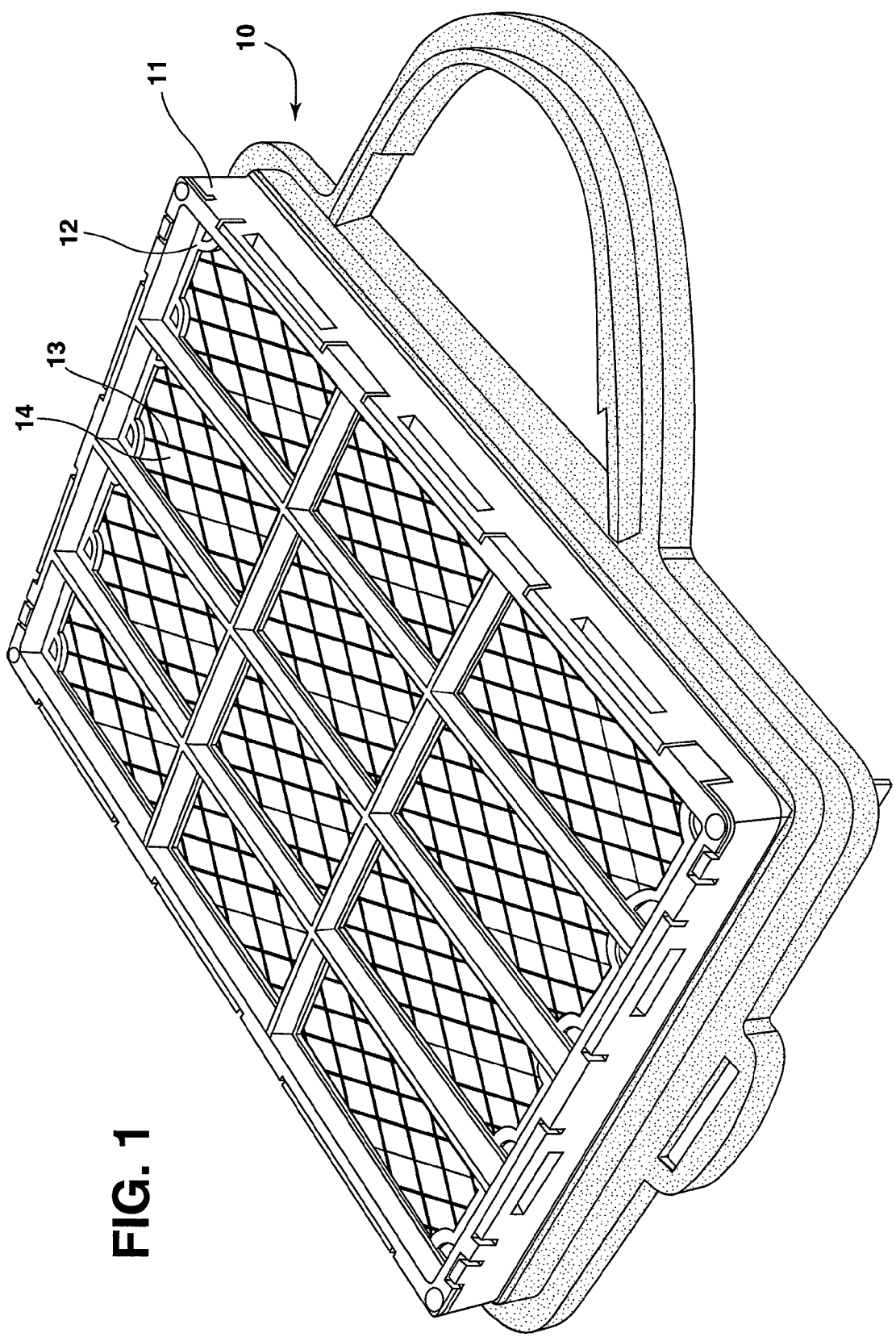
FIG. 1 shows a fully constructed filter structure of the present invention.

"Bicomponent fiber" means a thermoplastic material having at least one fiber portion with a melting point and a second thermoplastic portion with a lower melting point. The physical configuration of these fibers is typically in a "side-by-side" or "sheath-core" structure. In side-by-side structure, the two resins are typically extruded in a connected form in a side-by-side structure. One could also use lobed fibers where the tips have lower melting point polymer. "Glass fiber" is fiber made using glass of various types. The term "secondary fibers" can include a variety of different fibers from natural synthetic or specialty sources. Such fibers are used to obtain a thermally bonded media sheet, media, or filter, and can also aid in obtaining appropriate pore size, permeability, efficiency, tensile strength, compressibility, and other desirable filter properties.

"Permeability" means the quantity of air ($ft^3$-$min^{-1}$-$ft^{-2}$ or $ft$-$min^{-1}$) that will flow through a filter medium at a pressure drop of 0.5 inches of water. In general, permeability, as the term is used is assessed by the Frazier Permeability Test according to ASTM D737 using a Frazier Permeability Tester available from Frazier Precision Instrument Co. Inc., Gaithersburg, Md. or a TexTest 3300 or TexTest 3310 (available from Advanced Testing Instruments Corp (ATI) of Spartanburg, S.C.).

"Pore size" or "XY pore size" as used in this disclosure means the theoretical distance between fibers in a filtration media. XY refers to the surface direction versus the Z direction which is the media's thickness. This calculation assumes that the all the fibers in a media are aligned parallel to the surface of the media, equally spaced, and are ordered as a square when viewed in cross section perpendicular to the length of the fibers. XY pore size is the diagonal distance between the fiber's surface on opposite corners of the square. If a media is composed of fibers with various diameters, the d2 mean of the fiber is used as the diameter. The d2 mean is the square root of the average of the diameters squared.

The media of the invention relates to a layered composite of non-woven air laid and wet laid media having formability, stiffness, tensile strength, low compressibility, and mechanical stability for filtration properties, as well as high particulate loading capability, low pressure drop during use and a pore size and efficiency suitable for use in filtering oily aerosols. The filter media employ bicomponent fibers and preferably do not include binders. Preferably, the filtration media of the invention is a combination of wet laid and air laid materials and is made up of randomly oriented arrays of media fibers, such as a combination of glass fiber or thermoplastic fiber and a bicomponent fiber. These fibers are bonded together using the bicomponent fiber, though it is also contemplated that a binder resin may be additionally employed.

Some layers of filter media of the invention are preferably made using papermaking processes. Such wet laid processes are particularly useful and many of the fiber components are designed for aqueous dispersion processing. A fiber slurry containing the materials are typically mixed to form a relatively uniform fiber slurry. The fiber slurry is then subjected to a wet laid papermaking process. In the preferred mode of wet laid processing, the medium is made from an aqueous furnish comprising a dispersion of fibrous material in an aqueous medium. The aqueous liquid of the dispersion is generally water, but may include various other materials such as pH adjusting materials, surfactants, defoamers, flame retardants, viscosity modifiers, media treatments, colorants and the like. Once the slurry is formed into a wet laid sheet, the wet laid sheet can then be dried, cured or otherwise processed to form a dry permeable, but real sheet, media, or filter. Once sufficiently dried and processed to filtration media, the sheets are typically about 0.32 to about 2.0 millimeter thick and have a basis weight of about 33 to 200 g-$m^{-2}$.

The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, remove the fluid aqueous components to form a wet sheet. Typically in a wet laid papermaking process, a fiber slurry containing the materials are typically mixed to form a relatively uniform fiber slurry. The fiber slurry is then formed into a wet laid sheet by draining water from the fibers. The wet laid sheet can then be dried, cured or otherwise processed to form a dry, permeable sheet, media, or filter. Once sufficiently dried and processed to filtration media, the sheets are typically about 0.25 to 1.9 millimeter in thickness, having a basis weight of about 20 to 200 or 30 to 150 g-$m^{-2}$.

For a commercial scale process, the bicomponent mats of the invention are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. A bicomponent mat of the invention can be prepared by forming pulp and glass fiber slurries and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bicomponent web. The web can then be coated with a binder by conventional means, e.g., by a flood and extract method and passed through a drying section which dries the mat and cures the binder, and thermally bonds the sheet, media, or filter. The resulting mat may be collected in a large roll. Thermal bonding takes place typically by melting some portion of the thermoplastic fiber, resin or other portion of the formed material. The melt material binds the component into a layer.

Another method used to make wet-laid filter media of the invention is by a handsheet process. A handsheet can be prepared by first dispersing the appropriate amount of glass and synthetic fibers separately in water which has been adjusted to a pH of about 3 using sulfuric acid. The fibers are slurried in a blender, then diluted 1:5 by volume with water and blended for at least 2 minutes. The mixed slurry is formed into a sheet using a standard handsheet mold in which a carrier sheet has been positioned. The water is then drained from the slurry, capturing the fibers on the carrier sheet. The wet sheet is dried and bonded using a flat sheet dryer at elevated temperature for a period of about 5 minutes. Multiple layers can be positioned to form an element.

The filter structure of the invention can comprise at least two different types of filter media supported on a mechanically stable perforate support structure. The different types of filter media can be stacked in multiple layers. For example, 20 layers of one type of filter media may be stacked contiguously, followed by 5 layers of another type of filter media. Multiple types of filter media can be employed. The skilled artisan will appreciate the ease with which a filter element can be tailored for a particular application.

In some embodiments of the invention, one or more layers of the filter element comprise different filter media. Preferably, the filter element comprises a stack of more than one layer each of at least two different media. One or more layers are preferably air laid media. A first filter medium can comprise between 1 and 100% by weight, more preferably 20 to 80% by weight of a first fiber comprising a bicomponent fiber having a diameter of between 5 and 50 microns, more preferably 10 to 30 microns. The first filter medium can have a pore size of 0.2 to 200 microns, more preferably 4 to 200 microns, and most preferably 50 to 150 microns. The first filter medium can have a permeability of 1 to 1000 ft-min$^{-1}$, preferably about 50 to 800 ft-min$^{-1}$, and most preferably about 140 to 460 ft-min$^{-1}$. The solidity of the first filter medium can be 2 to 25% at 860 Pa, preferably 2 to 10% at 860 Pa, and more preferably 3 to 8% at 860 Pa. The basis weight of the first filter medium can be 5 to 1000 g-m$^{-2}$, preferably 50 to 500 g-m$^{-2}$, and more preferably 150 to 350 g-m$^{-2}$. The first filter medium can also comprise 5 to 50% of a second fiber. The second fiber can have a fiber diameter of 0.1 to 50 microns, preferably 0.5 to 30 microns. The overall thickness of the first filter medium can be 0.05 to 22 millimeters at 860 Pa, preferably 0.5 to 11 millimeters at 860 Pa, and more preferably 1 to 5 millimeters at 860 Pa. The first filter medium can have a compressibility of 0.5 to 1.0 between 860 and 3860 Pa, preferably 0.7 to 1.0 between 860 and 3860 Pa.

In embodiments of the invention, a second filter medium is provided as one or more layers in the stacked filter element. The second filter medium is different from the first filter medium. As used to describe the second filter medium, "different" means having a different composition of fibers, having a surface treatment or a different surface treatment than the first filter medium, having a different percent distribution of fiber types, having a different total thickness of the filter medium, or having been made by a different technique, e.g. air laid vs. wet laid. Further, the second filter medium may differ in terms of pore size, permeability, basis weight, solidity, compressibility, thickness, diameter of fibers used, or in any manner that results in filtration properties that differ between the first and second filter media.

In some embodiments of the invention, the second filter medium can have pore size of 0.2 to 200 microns, preferably about 4 to 200 microns, and more preferably about 40 to 70 microns. The second filter medium can have a permeability of 1 to 1000 ft-min$^{-2}$, preferably about 50 to 800 ft-min$^{-2}$, and more preferably about 350 to 650 ft-min$^{-2}$. The second filter medium can have a solidity of about 2 to 25% at 860 Pa, preferably about 2 to 10% at 860 Pa, and more preferably about 5 to 8% at 860 Pa. The second filter medium can have a basis weight of 5 to 1000 g-m$^{-2}$, preferably about 20 to 120 g-m$^{-2}$, and more preferably about 30 to 50 g-m$^{-2}$. The second filter medium can have a compressibility of about 0.5 to 1.0 between 860 Pa and 3860 Pa, preferably about 0.7 to 1.0 between 860 Pa and 3860 Pa. The second filter medium can have a total thickness of about 0.05 to 22 millimeter at 860 Pa, preferably about 0.3 to 3.6 millimeter at 860 Pa, and more preferably about 0.5 to 0.8 millimeter at 860 Pa.

Either or both of the first and second filter media can further comprise a surface treatment present on one or more fibers. The surface treatment can be applied to the fibers prior to forming the filter medium or may be applied after forming the medium. The surface treatment is preferably, but not limited to, a silicone, a fluorochemical, an amphoteric molecule, or mixtures thereof.

The filter element of the present invention is assembled by cutting filter sheets to a desired shape, and stacking at least one layer of at least a first and a second filter media in an order that provides the desired filtration properties. Thus, a first filter medium is assembled having the properties outlined above, and the second filter medium is assembled separately, the second filter medium having the properties outlined above. Air laid and wet laid techniques may therefore both be used, or a single technique may be used to make both a first and second filter medium. Additional filter media, such as third and fourth media, may also be employed wherein each layer is different as defined above.

The filter element is formed by stacking layers of filter media together. Preferably, the filter media are contained within a supporting structure that securely holds the layers in place against each other. Preferably, the support is apertured.

In crank case filtration applications, large quantities of both solid soot particles and small, liquid oil particle aerosols must be captured under relatively high pressure and high volume of fluid throughput. Further, the oil must collect in the element and eventually drain from the element back into the engine's oil sump. Filtration elements of the present invention therefore are made of a layer or layers of filter media that effectively remove solid particles but allow oily aerosol particles to pass through, and a layer or layers that entrap oily aerosol and allow the collected oil to coalesce and drain. The composition of each set of layers can be varied to optimize efficiency, pressure drop and drainage performance.

Thus, an embodiment of the invention is a method of filtering particles from a fluid stream, comprising the steps of contacting a heavily particulate loaded stream of fluid with a filter element of the invention and retaining the particulate in the filter element while allowing the fluid stream to pass through. The fluid stream can have more than one type of particulate, wherein the particulates have different average particle sizes. The fluid stream can be air, industrial waste gas, crank case blow-by gas, an inert gas such as nitrogen, helium, argon, and the like, or any other fluid. The particles may be different phases, i.e. a solid particle and a liquid particle. Solid particulates can be, for example, smoke, soot, talc, asbestos, carbon, solid nanoparticle, or a combination of solid particles. Liquid particulates can be, for example, water vapor, fuel, hydraulic fluid, oil such as machine oil, engine oil, lubricant oil, and the like; an emulsion, a hydrophobic or hydrophilic aerosol or liquid, a volatile organic chemical, or a combination of liquid particles. The foregoing examples are illustrative and are not limiting as to the species of materials that can be entrapped by embodiments of the filter element of the invention.

Preferably, liquid particles that are trapped by a filter element of the invention coalesce on the filter element and then drain off of the filter element. Such an embodiment allows for a greater effective lifetime of the filter element of the invention. Especially where two types of particulates are trapped and one of the particulates is liquid, it is preferable that one of the at least two different filter media entrap, coalesce, and drain the liquid while a second filter media entraps the second particulate.

Certain preferred arrangements according to the present invention include filter media as generally defined, stacked in continuous touching relation in an overall filter element having several layers. Thus, in a particularly preferred arrangement, two or more air laid filter media having high loft, large pore size, and high permeability are stacked together with multiple layers of wet-laid media having lower loft, smaller pore size, and lower permeability, such that a pore size gradient is created. More than one different air laid filter medium may be stacked together with more than one different wet laid filter medium. In this manner, a broad range of pore size gradient, filter element thickness, and filtering capability may be easily assembled.

The at least two layers of different filter media used to form a stacked filter element can be a loading layer and an efficiency layer, each of said layers having distinct structures and filtration properties, to form a composite filter element. The loading layer is followed in a fluid pathway by an efficiency layer. The loading layer is a high loft, high porosity layer suitable for capturing large loads of solid particulates, such as soot, from a fluid stream without clogging. The loading layer allows aerosols to pass through and does not filter significant amounts of aerosol from the fluid stream. The efficiency layer is a highly efficient layer having suitable porosity, efficiency, permeability and other filtration characteristics to remove aerosol from the fluid stream as the fluid passes through the filter structure. Preferably, one or more layers of the filter element also facilitate the coalescence and draining of oily aerosols from the filter element.

Solid particulates are generally filtered from a fluid stream such that they are retained on the filter fibers. Thus, it is preferable to provide particle filtration media having a very large effective pore size, yet providing sufficient surface area to cause contact with the majority of particles in the fluid stream so that the particles are removed from the stream. Large pore size is also advantageously used to lengthen the filter element life by preventing clogging by the entrapped particles.

Filtration performance (relative low pressure drop, high efficiency) for filtering solid particulates, coupled with space requirements for filtering high loadings of soot, necessitates relatively thick layers composed of open media. Such a construction facilitates efficient filtration by providing a large surface area, both at the upstream face as well as within the layer, for soot deposition without clogging the finer layers disposed downstream in the layered construction. This construction may be present in several layers stacked atop one another until efficient removal of soot is accomplished in a particular application, or it may be sufficient for some applications to have only one such high loft, low pressure drop layer.

Filter media for entrapping oily aerosols from soot loaded CCV units should be situated downstream of the thick, open layers that trap the soot. These downstream layers should have a more compact, lower loft, lower porosity construction to trap the small particles of aerosol. However, these downstream layers desirably also will allow liquid particulates to coat the layers, coalesce into a liquid phase, and drain away from the filter so that the collected oil may be redirected to the crankcase of a diesel engine. One such layer may be sufficient for effectively entrapping and draining oily aerosol, or several layers may be stacked one atop the next in order to effectively trap and drain all the oily aerosol.

Due to filtration system size constraints, the oily aerosol filtration layers must be designed for equilibrium fractional efficiency. Equilibrium fractional efficiency is defined as the element's efficiency once the element is draining liquid at a rate equal to the collection rate. The three performance properties, initial and equilibrium fractional efficiency, pressure drop, and drainage ability, are balanced against the element's design to achieve optimum performance. Thus, as an example, one or only a few layers of thin filtration media in a high liquid loading environment must be designed to drain at a relatively fast rate.

Filter media used for the purpose of collecting and draining liquid particulates are typically aligned vertically, which enhances the filter's capability to drain. In this orientation, any given media composition will exhibit an equilibrium liquid height which will be a function of the XY pore size, fiber orientation, and the interaction of the liquid with the fibers' surface, measured as contact angle. The collection of liquid in the media will increase the height to a point balanced with the drainage rate of liquid from the media. Any portion of the media that is plugged with draining liquid would not be available for filtration thus increasing pressure drop and decreasing efficiency across the filter. Thus it is advantageous to minimize the portion of the element that retains liquid.

The three media factors effecting drainage rate are XY pore size, fiber orientation, and interaction of the liquid being drained with the fiber's surface. All three factors can all be modified to minimize the portion of the media that is plugged with liquid. The XY pore size of the element can be increased to enhance the drainage capability of the media but this approach has the effect of reducing the number of fibers available for filtration and thus the efficiency of the filter. To achieve target efficiency, a relatively thick structure may be needed, typically greater than 0.125 inches, due to the need for a relatively large XY pore size. This is easily achieved using the filter elements of the present invention, as many layers may be stacked together to form the most effective total thickness. The interaction of the liquid being drained with the surface of the fibers can be modified to enhance the drainage rate. This invention disclosure supports this approach.

It should be understood that the two layering components may be sufficient in a particular application; however, it may be advantageous to include further layering components such that a finer gradient of effective pore size is realized. The skilled artisan will appreciate the ease with which the composition of layers and the number of layers of each composition may be varied for a particular application.

A preferred layering arrangement provides a filter element that is capable of trapping solid particulate in the first few layers of the filter element, wherein liquid particulate passes through the first few layers and is trapped in layers that are further along inside the filtration pathway and further along the filtration pore size gradient. Most preferably, the liquid aerosol will further condense as it coats the filter fibers, eventually draining out of the filter by gravitational force to be collected in a receptacle. In this manner, the liquid is effectively separated from the solid particulate and is advantageously collected, allowing for liquid recycling and prolonging the life of the filter element.

Often, when combining discrete layers, the laminating techniques result in loss of useful filtration surface area. This is true of most adhesive laminating systems performed by coating one surface with adhesive and then contacting the layers together, whether this is done in a homogeneous coating or in a dot pattern. The same is true of point-bonded material using ultrasonic bonding. A unique feature when using bicomponent fibers in the filter sheet or material is the bicomponent not only bonds the fibers of individual layers together, but can also act to bond the layers together. This has been accomplished in conventional heat lamination as well as through pleating. And, advantageously, the filter elements of the present invention provide gradient structures with ease, and the ideal filtration capability for a given application is easily arrived at by varying the number of layers with different compositions and the particular compositions and means of making of the filter media used.

The filter elements of the invention are commonly is housed in a filter panel, cartridge or other unit commonly used in the filtration of fluids such as liquid or air. It will be appreciated that a feature of the invention is that sheets of filtration media are easily cut into virtually any shape desirable and stacked in a housing to form a filter element. Thus, specially shaped panels or cartridges may be used with ease. A pervious support structure can support the filter element under the influence of fluid under pressure passing through the media and support. A mechanical support can comprise additional layers of the perforate support, wire support, a high permeability scrim or other support.

One of the fibers useful in forming filter media of the present invention are bicomponent fibers. Melting of the first polymer component of the bicomponent fiber is necessary to allow the bicomponent fibers to form a tacky skeletal structure, which upon cooling, captures and binds many of the secondary fibers, as well as binds to other bicomponent fibers. Various combinations of polymers for the bicomponent fiber may be useful in the present invention, but it is important that the first polymer component melt at a temperature lower than the melting temperature of the second polymer component and typically below 205° C. Further, the bicomponent fibers are integrally mixed and evenly dispersed with the pulp fibers.

A commonly used bicomponent fiber comprises a sheath-core structure. In the sheath-core structure, the low melting point (e.g., about 80 to 205° C.) thermoplastic is typically extruded around a fiber of the higher melting (e.g., about 120 to 260° C.) point material. In use, the bicomponent fibers typically have a fiber diameter of about 5 to 50 micrometers often about 10 to 20 micrometers and typically in a fiber form generally have a length of 0.1 to 20 millimeters or often have a length of about 0.2 to about 15 millimeters. Any thermoplastic that can have an appropriate melting point can be used in the low melting component of the bicomponent fiber while higher melting polymers can be used in the higher melting "core" portion of the fiber. The cross-sectional structure of such fibers can be, as discussed above, the "side-by-side" or "sheath-core" structure or other structures that provide the same thermal bonding function. One could also use lobed fibers where the tips have lower melting point polymer. The value of the bicomponent fiber is that the relatively low molecular weight resin can melt under sheet, media, or filter forming conditions to act to bind the bicomponent fiber, and other fibers present in the sheet, media, or filter making material into a mechanically stable sheet, media, or filter.

Typically, the polymers of the bicomponent (core/shell or sheath and side-by-side fibers are made up of different thermoplastic materials, such as for example, polyolefin/polyester (sheath/core) bicomponent fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like.

Particularly preferred in the present invention is a sheath-core bicomponent fiber known as Advansa 271P, a 14 micrometer diameter fiber available from EXSA Americas, New York, N.Y. Other useful fibers include FIT 201 (available from Fiber Innovation Technology, Inc. of Johnson City, Tenn.), Kuraray N720 (available from the Kuraray Co., Ltd. of Osaka, Japan) and similar commercially available materials. All of these fibers demonstrate the characteristics of cross-linking the sheath polymer upon completion of first melt. This is important for liquid applications where the application temperature is typically above the sheath melt temperature. If the sheath does not fully crystallize then the sheath polymer will remelt in application and coat or damage downstream equipment and components.

After formation and thermal bonding at or above the melt temperature of the lower melting portion of the bicomponent fiber, the filter media of the invention can be used at temperatures above that melting temperature. Once thermally formed, the media appears to be stable at temperatures at which the media should lose mechanical stability due to the softening or melting of the fiber. We believe that there is some interaction in the bonded mass that prevents the melting of the fiber and the resulting failure of the media. Accordingly, the media can be used with a mobile gaseous or liquid phase at a temperature equal to or 10° to 100° F. above the melt temperature of the lower melting portion of the bicomponent fiber. Such applications include hydraulic fluid filtration, lubricant oil filtration, hydrocarbon fuel filtration, hot process gas filtration, etc.

Media fibers may also be employed in filter media of the present invention. Media fibers are fibers that can aid in filtration or in forming a structural media layer. Such fiber is made from a number of both hydrophilic, hydrophobic, oleophilic, and oleophobic fibers. These fibers cooperate with the glass fiber and the bicomponent fiber to form a mechanically stable, but strong, permeable filtration media that can withstand the mechanical stress of the passage of fluid materials and can maintain the loading of particulate during use. Such fibers are typically monocomponent fibers with a diameter that can range from about 0.1 to about 50 micrometers and can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type a structural fiber cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

Thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46). Other useful fibers include cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. In addition, the thermoplastic fibers may be surface treated with a dispersing aid. The preferred thermoplastic fibers are polyamide and polyethylene terephthalate fibers, with the most preferred being polyethylene terephthalate fibers.

The preferred media fiber comprises a glass fiber used in media of the present invention include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers. Such fiber is typically used as a diameter about 0.1 to 16 micrometers and an aspect ratio (length divided by diameter) of about 10 to 10000. These commercially available fibers are characteristically sized with a sizing coating. Such coatings cause the otherwise ionically neutral glass fibers to form and remain in bundles. Glass fiber in diameter less than about 1 micron is not sized. Large diameter chopped glass is sized.

Manufacturers of glass fibers commonly employ sizes such as this. The sizing composition and cationic antistatic agent eliminates fiber agglomeration and permits a uniform dispersion of the glass fibers upon agitation of the dispersion in the tank. The typical amount of glass fibers for effective dispersion in the glass slurry is within the range of 50% to about 90%, and most preferably about 50-80%, by weight of the solids in the dispersion. Blends of glass fibers can substantially aid in improving permeability of the materials. We have found that combining a glass fiber having an average fiber diameter of about 0.3 to 0.5 micrometer, a glass fiber having an average fiber diameter of about 1 to 2 micrometers, a glass fiber having an average fiber diameter of about 3 to 6 micrometers, a glass fiber with a fiber diameter of about 6 to 10 micrometers, and a glass fiber with a fiber diameter of about 10 to 100 micrometers in varying proportions can substantially improve permeability. We believe the glass fiber blends obtain a controlled pore size resulting in a defined permeability in the media layer. Useful glass fibers are commercially available from, for example, the Owens-Corning Corporation of Toledo, Ohio, and the Lauscha Fiber International Co. of Summerville, S.C.

In some embodiments of the invention it may be useful to employ binder resins. A resinous binder component is not necessary to obtain adequate strength for the filter media of this invention, but may be advantageously used. Binder resins can typically comprise water-soluble or water sensitive polymer materials. Its polymer materials are typically provided in dry form or in solvent or waterbased dispersions. Binder resins can be used to help bond the fiber into a mechanically stable media layer, in embodiments where one or more filter medium components could be released during use and become a nuisance when airborne as dust. Binders can also be used to increase stiffness of the filter media of the invention.

Examples of useful binder polymers include vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting resins such as urea phenol, urea formaldehyde, melamine, epoxy, polyurethane, curable unsaturated polyester resins, polyaromatic resins, resorcinol resins and similar elastomer resins. The preferred materials for the water soluble or dispersible binder polymer are water soluble or water dispersible thermosetting resins such as acrylic resins. methacrylic resins, polyamide resins, epoxy resins, phenolic resins, polyureas, polyurethanes, melamine formaldehyde resins, polyesters and alkyd resins, generally, and specifically, water soluble acrylic resins. methacrylic resins, polyamide resins, that are in common use in the papermaking industry. Such binder resins typically coat the fiber and adhere fiber to fiber in the final non-woven matrix. Sufficient resin is added to the furnish to fully coat the fiber without causing film over of the pores formed in the sheet, media, or filter material. The resin can be added to the furnish during papermaking or can be applied to the media after formation.

The latex binder is used at an amount that does not substantially form a film covering the pores of the filter media. The binder is used in an amount sufficient to bind together the three-dimensional non-woven fiber web in each non-woven layer or used as an adhesive in cooperation with the adhesive properties imparted by the bicomponent fiber. The binder can be selected from various latex adhesives known in the art. The skilled artisan can select the particular latex adhesive depending upon the type of cellulosic fibers that are to be bound. The latex adhesive may be applied by known techniques such as spraying or foaming. Generally, latex adhesives having from 5 to 25% solids are used. The dispersion can be made by dispersing the fibers and then adding the binder material or dispersing the binder material and then adding the fibers. The dispersion can, also, be made by combining a dispersion of fibers with a dispersion of the binder material. The concentration of total fibers in the dispersion can range from 0.01 to 5 or 0.005 to 2 weight percent based on the total weight of the dispersion. The concentration of binder material in the dispersion can range from 10 to 50 weight percent based on the total weight of the fibers.

Non-woven media of the invention can also contain secondary fibers made from a number of both hydrophilic, hydrophobic, oleophilic, and oleophobic fibers. These fibers cooperate with the media fiber and the bicomponent fiber to form a mechanically stable, strong, and permeable filtration media that can withstand the mechanical stress of the passage of fluid materials and can maintain the loading of particulate during use. Secondary fibers are typically monocomponent fibers with a diameter that can range from about 0.1 to about 50 micrometers and can be made from a variety of materials including naturally occurring cotton, linen, wool, various cellulosic and proteinaceous natural fibers, glass fibers, synthetic fibers including rayon, acrylic, aramide, nylon, polyolefin, polyester fibers. One type of secondary fiber is a binder fiber that cooperates with other components to bind the materials into a sheet. Another type of secondary fiber is a structural fiber that cooperates with other components to increase the tensile and burst strength the materials in dry and wet conditions. Secondary fibers may be comprised of thermoplastic or thermoset materials. Secondary fibers can also include inorganic fibers such as carbon/graphite fiber, metal fiber, ceramic fiber and combinations thereof.

Thermoplastic secondary fibers can be made from synthetic polymeric materials such as polyester fibers, polyamide fibers, polyolefin fibers such as polyethylene or polypropylene fibers, copolyetherester fibers, polyethylene terephthalate fibers, polybutylene terephthalate fibers, polyethylene-vinyl acetate copolymers, polyetherketoneketone (PEKK) fibers, polyetheretherketone (PEEK) fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), polyacrylate fibers, liquid crystalline polymer (LCP) fibers, and copolymers and mixtures thereof. Polyamide fibers include, but are not limited to, nylon 6, 66, 11, 12, and 612. The fibers may also be made from naturally occurring materials including cellulosic fibers, cotton fibers, or viscose rayon fibers.

The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. In addition, the thermoplastic fibers may be surface treated with a dispersing aid. The preferred thermoplastic fibers are polyamide and polyethylene terephthalate fibers, with the most preferred being polyethylene terephthalate fibers.

Hydrophilic or hydrophobic modification of the surface characteristics of the fibers in media, such as increasing the contact angle of water or oil, may be used to enhance the liquid binding and the drainage capability of the filtration media and thus the performance of a filter (reduced pressure drop and improved mass efficiency). Various fibers are used in the design of for example filtration media used for low pressure filters such as mist filters or others (less than 1 psi terminal pressure drop). One method of modifying the surface of the fibers is to apply a surface treatment such as a fluorochemical or silicone containing material, 0.001 to 5% or about 0.01 to 2% by weight of the media. We anticipate modifying the surface characteristics of the fibers in a wet laid layer that can include bicomponent fibers, other secondary fiber such as a synthetic, ceramic or metal fibers with and without additional resin binder. The resulting media would be incorporated into multilayered filter element structures. The use of surface modifiers should allow the construction of media with smaller XY pore sizes than untreated media, thereby increasing efficiency with the use of small fibers, reducing the thickness of the media for more compact elements, and reducing the equilibrium pressure drop of the element.

Fluorochemical agents useful in this invention for addition to the fiber layers are molecules represented by the formula $$R_f\text{-}G$$

wherein $R_f$ is a fluoroaliphatic radical and G is a group which contains at least one hydrophilic group such as cationic, anionic, nonionic, or amphoteric groups. Nonionic materials are preferred. $R_f$ is a fluorinated, monovalent, aliphatic organic radical containing at least two carbon atoms. Preferably, it is a saturated perfluoroaliphatic monovalent organic radical. However, hydrogen or chlorine atoms can be present as substituents on the skeletal chain. While radicals containing a large number of carbon atoms may function adequately, compounds containing not more than about 20 carbon atoms are preferred since large radicals usually represent a less efficient utilization of fluorine than is possible with shorter skeletal chains. Preferably, $R_f$ contains about 2 to 8 carbon atoms.

The cationic groups that are usable in the fluorochemical agents employed in this invention may include an amine or a quaternary ammonium cationic group which can be oxygen-free (e.g., $-NH_2$) or oxygen-containing (e.g., amine oxides). Such amine and quaternary ammonium cationic hydrophilic groups can have formulas such as $-NH_2$, $-(NH_3)X$, $-(NH(R^2)_2)X$, $-(NH(R^2)_3)X$, or $-N(R_2)_2 \rightarrow O$, where x is an anionic counterion such as halide, hydroxide, sulfate, bisulfate, or carboxylate, $R^2$ is H or $C_{1-18}$ alkyl group, and each $R^2$ can be the same as or different from other $R^2$ groups. Preferably, $R^2$ is H or a $C_{1-16}$ alkyl group and X is halide, hydroxide, or bisulfate.

The anionic groups which are usable in the fluoro-organic wetting agents employed in this invention include groups which by ionization can become radicals of anions. The anionic groups may have formulas such as $-COOM$, $-SO_3M$, $-OSO_3M$, $-PO_3HM$, $-OPO_3M_2$, or $-OPO_3HM$, where M is H, a metal ion, $(NR^1_4)^+$, or $(SR^1_4)^+$, where each $R^1$ is independently H or substituted or unsubstituted $C_1$-$C_6$ alkyl. Preferably M is $Na^+$ or $K^+$. The preferred anionic groups of the fluoro-organo wetting agents used in this invention have the formula $-COOM$ or $-SO_3M$. Included within the group of anionic fluoro-organic wetting agents are anionic polymeric materials typically manufactured from ethylenically unsaturated carboxylic mono- and diacid monomers having pendent fluorocarbon groups appended thereto.

The amphoteric groups which are usable in the fluoro-organic wetting agent employed in this invention include groups which contain at least one cationic group as defined above and at least one anionic group as defined above. Alternatively, nonionic amphoteric materials such as stearyl groups bonded to several ethylene oxide repeat units are known in the art and may also be employed.

The nonionic groups which are usable in the fluoro-organic wetting agents employed in this invention include groups which are hydrophilic but which under pH conditions of normal agronomic use are not ionized. The nonionic groups may have formulas such as $-O(CH_2CH_2)xOH$ where x is greater than 1, $-SO_2NH_2$, $-SO_2NHCH_2CH_2OH$, $-SO_2N(CH_2CH_2H)_2$, $-CONH_2$, $-CONHCH_2CH_2OH$, or $-CON(CH_2CH_2OH)_2$. Examples of such materials include materials of the following structure:

$$F(CF_2CF_2)_n\text{---}CH_2CH_2O\text{---}(CH_2CH_2O)_m\text{---}H$$

wherein n is 2 to 8 and m is 0 to 20.

Other useful fluorochemical agents include those cationic fluorochemicals described, for example in U.S. Pat. Nos. 2,764,602; 2,764,603; 3,147,064 and 4,069,158. Such amphoteric fluorochemical agents include amphoteric fluorochemicals as described, for example, in U.S. Pat. Nos. 2,764,602; 4,042,522; 4,069,158; 4,069,244; 4,090,967; 4,161,590 and 4,161,602. Anionic fluorochemical wetting agents include anionic fluorochemicals described, for example, in U.S. Pat. Nos. 2,803,656; 3,255,131; 3,450,755 and 4,090,967.

There are numerous methods of modifying the surface of the fibers. Fibers that enhance drainage can be used to manufacture the media. Treatments can be applied during the manufacture of the fibers, during manufacture of the media or after manufacture of the media as a post treatment. Numerous treatment materials are available such as fluorochemicals or silicone containing chemicals that increase the contact angle. Numerous fibers incorporated into filter media can be treated to enhance their drainage capability. Bicomponent fibers composed of polyester, polypropylene or other synthetic polymers can be treated. Glass fibers, synthetic fibers, ceramic, or metallic fibers can also be treated.

Representative but non-limiting examples of such surface treatment materials are DuPont Zonyl FSN, Dupont Zonyl 7040, and DuPont Zonyl FSO nonionic surfactants (available from the DuPont Company of Wilmington, Del.). Another aspect of additives that can be used in the polymers of the invention include low molecular weight fluorocarbon acrylate materials having the general structure:

$$CF_3(CX_2)_n\text{-acrylate}$$

wherein X is —F or —$CF_3$ and n is 1 to 7.

Mechanical attributes are important for filter media including wet and dry tensile strength, burst strength, etc. Compressibility characteristic is also important, because it is a measure of the resistance to compression or deformation in the direction of fluid flow through the media. Compressibility must be sufficient to maintain a material's thickness and thereby maintain its pore structure and filtration flow and particulate removal performance. Many high efficiency wet laid materials using conventional resin saturation, melt blown materials, and other air laid materials lack this compressive strength and collapse under pressure. This is especially a problem with liquid filters, but can also be a problem with gas filters. The filter media of the present invention have compressibility of more than 0.5 between 860 and 3860 Pa, preferably have compressibility of greater than 0.7 between 860 and 3860 Pa and most preferably have a compressibility of greater than 0.9 between 860 and 3860 Pa.

The following experiments further set forth nonlimiting aspects of the invention, including the best mode.

Experimental Section

General Experimental Techniques

1. Basis Weight

Basis weight is the weight per square unit of area of a sheet of filter media. The measurement is made by cutting sheets of media into 12×12 squares and measuring the weight and converting the ratio into units of grams per square meter ($g/m^2$). The test is repeated two times and the average of the tests is the reported basis weight.

2. Compressibility

Compressibility is defined as the fractional change in thickness when the pressure applied during thickness measurement is increased. Compressibility of the materials of the invention is measured by taking the ratio the thickness of a filter media sheet at two different pressures. In these examples, the two pressures are 860 Pa and 3860 Pa; thus, compressibility is expressed as the ratio of thickness at 3860 Pa to thickness at 860 Pa.

3. Permeability

Permeability relates to the quantity of air ($ft^3$-$min^{-1}$-$ft^{-2}$ or ft-$min^{-1}$) that will flow through a filter medium at a pressure drop of 0.5 inches of water. In general, permeability, as the term is used is assessed by the Frazier Permeability Test according to ASTM D737 using a Frazier Permeability Tester available from Frazier Precision Instrument Co. Inc., Gaithersburg, Md. or a TexTest 3300 or TexTest 3310 (available from Advanced Testing Instruments Corp (ATI) of Spartanburg, S.C.).

4. Pore Size

Pore size, or "XY pore size" is the theoretical distance between fibers in a filtration media. XY refers to the surface direction versus the Z direction which is the media's thickness. This calculation assumes that the all the fibers in a media are aligned parallel to the surface of the media, equally spaced, and are ordered as a square when viewed in cross section perpendicular to the length of the fibers. XY pore size is the diagonal distance between the fiber's surface on opposite corners of the square. If a media is composed of fibers with various diameters, the d2 mean of the fiber is used as the diameter. The d2 mean is the square root of the average of the diameters squared.

Pore size is calculated as follows:

Media basis weight (mass/unit area)=B

Media thickness=T

Mass fraction of fiber[1]=M

Fibers/unit volume=F

XY pore size=P

Fiber mass/unit length=m

Fiber diameter=d

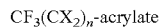

$$P = [\text{sq rt}(2F)] - d$$

where $F=[\Sigma((B \times M)/(T \times m))]^{-1}$

[1] Mass fraction refers to the fraction of a fiber species in the filter media. Thus, if a first fiber is present in the medium at 60 weight percent, M=0.6.

EXAMPLE 1

Wet-laid filter media were prepared according to the following technique. Glass and synthetic fibers were dispersed separately in 1 L water where the pH was first adjusted to about 3 using sulfuric acid. The fibers were slurried by blending in a Waring 2 speed blender (model # 7009G, available from Waring Products of Torrington, Conn.). The fiber slurries were then diluted to a total of 5 L with 4 L of water and blended for an additional 2 minutes or more. The mixed slurry was transferred to a standard a Formax 12×12 inch G-100 handsheet mold (available from Bescorp Inc. of Dover, N.H.), in which a carrier sheet of Reemay 2200 (available from Fiberweb plc of Old Hickory, Tenn.) was positioned. The sheet was carefully flooded so as to ascertain that no air bubbles were entrained. The water was then drained from the slurry. The wet sheet was dried and bonded using an Emerson Speed Dryer, Model 135 (available from Kalamazoo Paper Chemicals of Richland, Mich.) flat sheet dryer at 285° F. for 5 minutes.

Using this technique, Filter Media FM-1 and FM-2 were formed. The composition of two experimental wet laid filter media, FM-1 and FM-2, are shown in Table 1. Also shown in Table 1 are physical properties of the filter media including basis weight, thickness at two different pressures and the fraction of the thickness compressed between the two pressures, pore size, and permeability.

TABLE 1

Composition and properties of experimental wet-laid filter media.

| Property | Units | FM-1 | FM-2 |
|---|---|---|---|
| Composition | | 50% 14 um polyester bicomponent cut 6 mm, 37% 12.4 um polyester cut 6 mm, 13% 11 um glass cut 6 mm | 50% 14 um polyester bicomponent cut 6 mm, 37% 24 um polyester cut 6 mm, 13% 16 um glass cut 6 mm |
| Fiber Type, source | | Bicomponent: Advansa 271P, Polyester: Advansa 205 WSD, Glass: Owens Corning CS-9501-11W | Bicomponent: Advansa 271P, Polyester: Minifibers 6 denier, low shrinkage, high tenacity, Glass: Owens Corning 16 um glass |
| Basis weight | gm/m$^2$ | 65.1 | 62.2 |
| Thickness$_1$ | mm at 860 Pa | 0.68 | 0.64 |
| Thickness$_2$ | mm at 3860 Pa | 0.58 | 0.58 |
| Compressibility | Fraction, Thickness$_2$ Thickness$_1$ | 0.86 | 0.91 |
| Calculated XY Pore size | um @ 3860 Pa | 44 | 64 |
| Permeability | m/min @ 125 Pa | 119 | 188 |

EXAMPLE 2

Air laid filter media of the present invention were obtained from Tangerding Bocholt GmbH of Bocholt, Germany. Tangerding reference number TB 180-T05 is referred to as FM-3 (Filter Media 3) in this and the following Examples. Tangerding reference number FF 320-T05-2 is referred to as FM-4 in this and the following Examples. And Tangerding reference number FF 180-T05-4 NP-0256/2 is referred to as FM-5 in this and following Examples. Composition of air-laid filter media, FM-3, FM-4, and FM-5 are shown in Table 2. Also shown in Table 2 are basis weight, thickness at two different pressures and the fraction of the thickness compressed between the two pressures, calculated XY pore size, and permeability for air laid filter media FM-3, FM-4, and FM-5.

EXAMPLE 3

Filter media from the examples above were cut into rectangular sheets 21.6 cm×14.5 cm. The sheets were layered to form a filter element. The filter elements were enclosed in a housing having a perforate support on both sides, as can be seen in FIGS. 1-4. A housing, support, and filter element together form a filter structure. The filter structures were constructed using multiple layers of filter media as shown in Table 3. The media was backed on the downstream side with an expanded metal mesh in a diamond pattern, as is seen in FIG. 1. The media was compressed to 3.4 cm between the perforate supports at the upstream and downstream ends of the filter structure.

A control filter structure, FStr-CTRL, was obtained for comparison in testing to FStr-1, -2, and -3 in Example 4, below. FStr-CTRL is a filter marketed for use in diesel engines and is available as Part No. SO40029 from the Donaldson Company, Inc. of Minneapolis, Minn.

TABLE 2

Composition and properties of experimental air-laid filter media.

| Property | Units | FM-3 | FM-4 | FM-5 |
|---|---|---|---|---|
| Composition | (none) | 24 um polyester bicomponent + polyester | 16.7 um polyester bicomponent + polyester | 16.7 um polyester bicomponent + polyester |
| Basis weight | gm/m$^2$ | 169.2 | 241 | 157 |
| Thickness$_1$ | mm at 860 Pa | 3.78 | 2.52 | 3.41 |
| Thickness$_2$ | mm at 3860 Pa | 3.15 | 2.31 | 2.96 |
| Compressibility | Fraction, Thickness$_2$ Thickness$_1$ | 0.83 | 0.91 | 0.87 |
| Calculated XY Pore size | μm @ 3860 Pa | 131 | 59 | 89 |
| Permeability | m/min @ 125 Pa | 141 | 58 | 98 |

TABLE 3

Filter structures formed from layers of filter media of the invention.

| Filter Structure No. | Upstream layer | No. of upstream layers | Middle layer | No. of middle layers | Downstream layer | No. of downstream layers |
|---|---|---|---|---|---|---|
| FStr-1 | FM-3 | 2 | FM-2 | 21 | FM-1 | 44 |
| FStr-2 | FM-4 | 2 | FM-2 | 21 | FM-1 | 44 |
| FStr-3 | FM-5 | 2 | FM-2 | 21 | FM-1 | 44 |
| FStr-CTRL | FM-1 | 67 | none | — | none | — |

Figure 2:
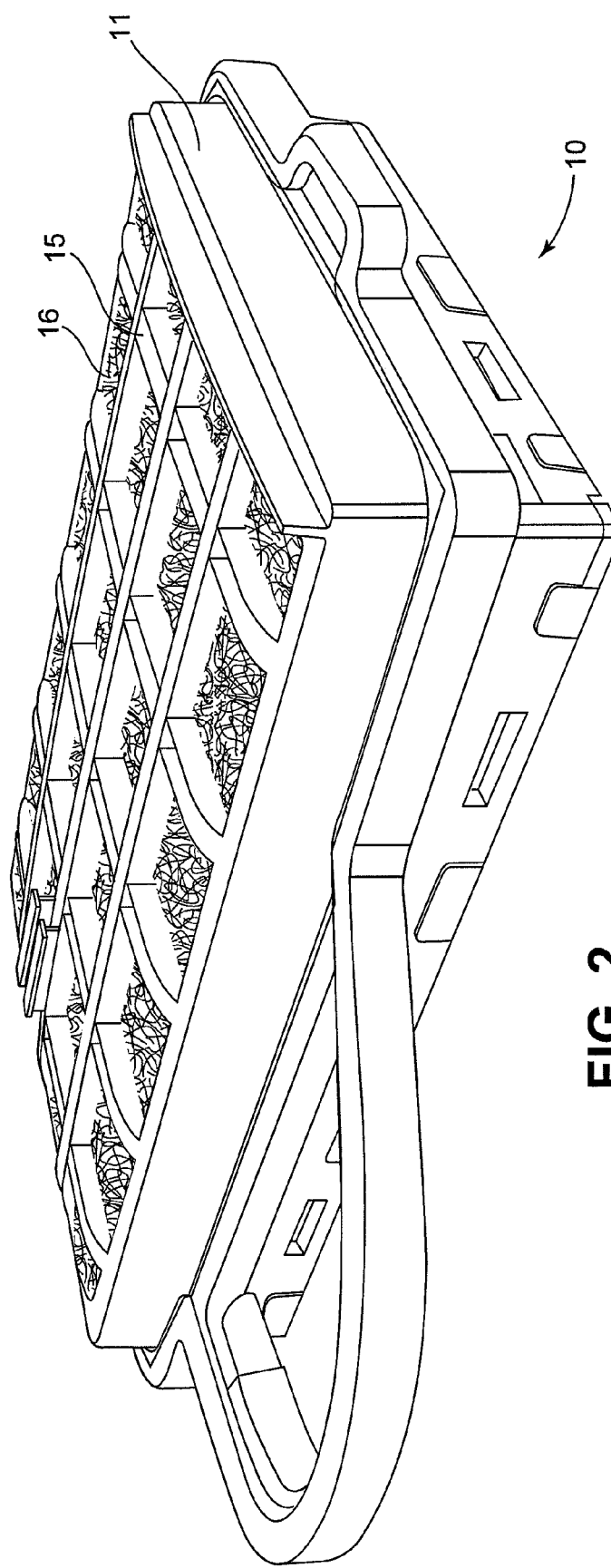
FIG. 2 shows a different aspect of a filter structure of the present invention.
Figure 3:
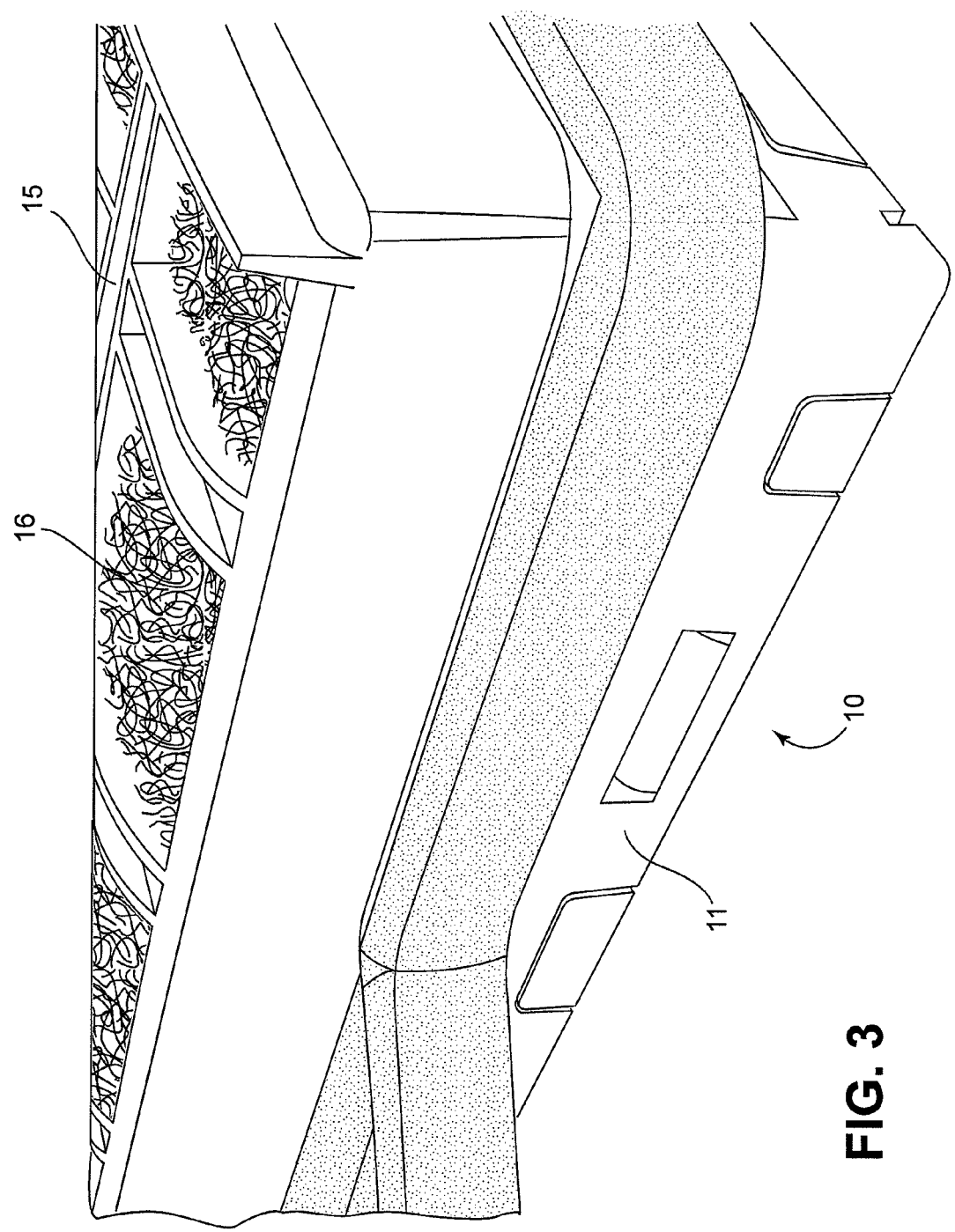
FIG. 3 is a closeup view of FIG. 2.
Figure 4:
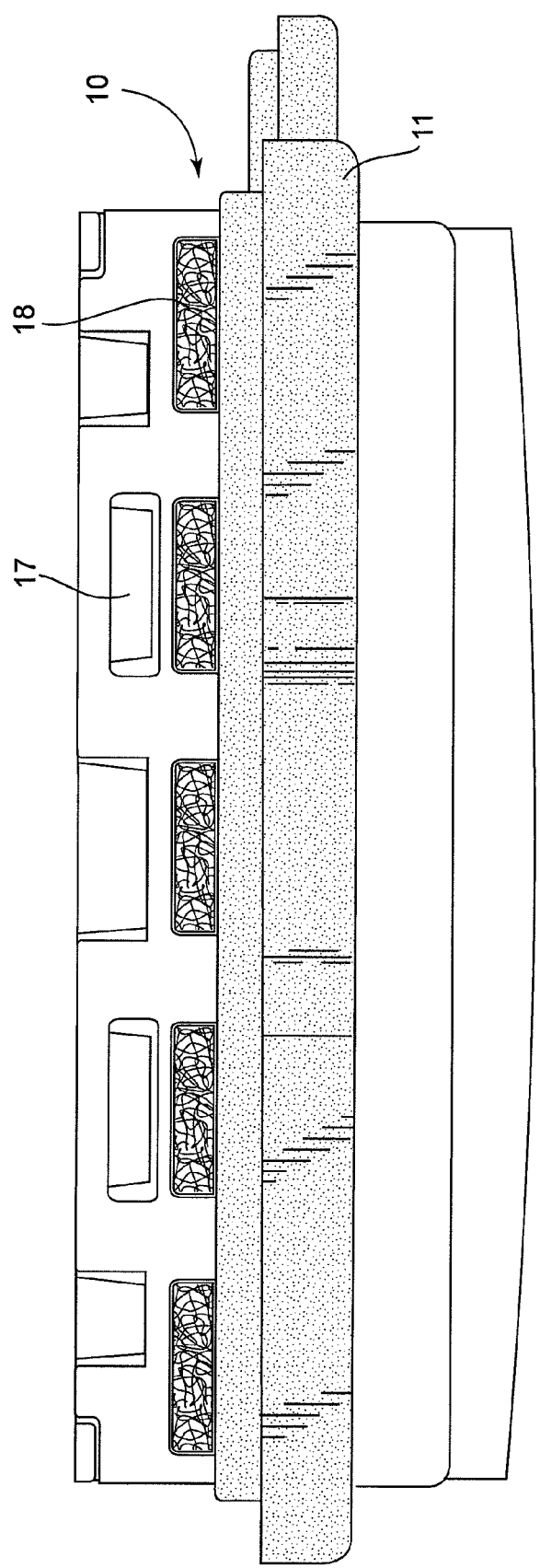
FIG. 4 is a side view of a filter structure of the present invention.

In more detail regarding the filter element construction, FIG. 1 shows a fully constructed filter structure 10 having housing 11 with downstream side 12 and perforate support 13, through which is visible a layer 14. FIG. 2 shows filter structure 10 having housing 11 with upstream side 15, through which is visible a layer of upstream filter media 16. FIG. 3 is a closeup view of FIG. 2, showing with greater detail filter structure 10 and housing 11, upstream side 15 and upstream filter media 16. FIG. 4 is a side view of filter structure 10, showing housing 11 and the tab-and-slot means 17 of securing the filter element 18 inside housing 11.

Figure 5:
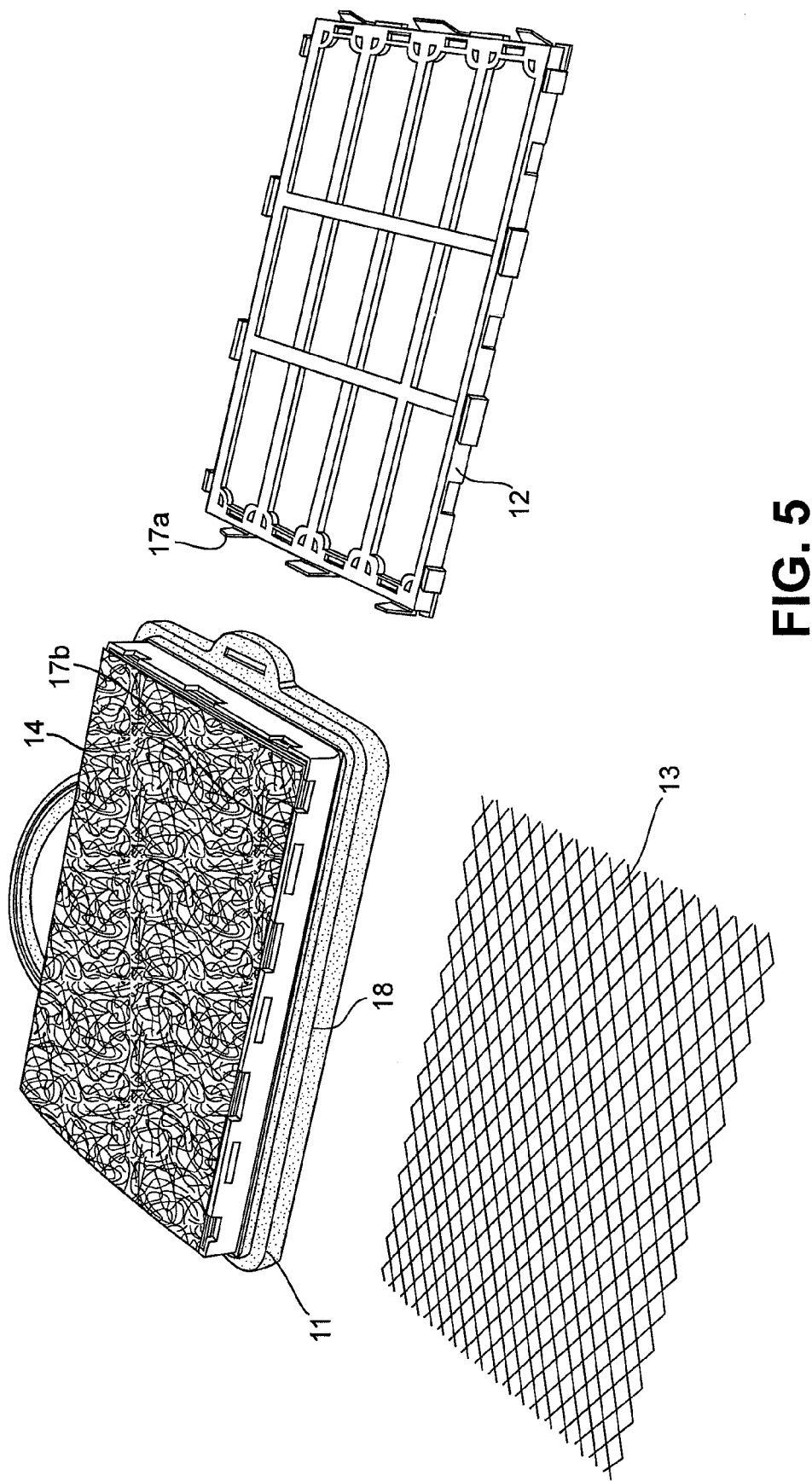
FIG. 5 is a deconstructed view of the filter structure shown in FIGS. 1-4.
Figure 6:
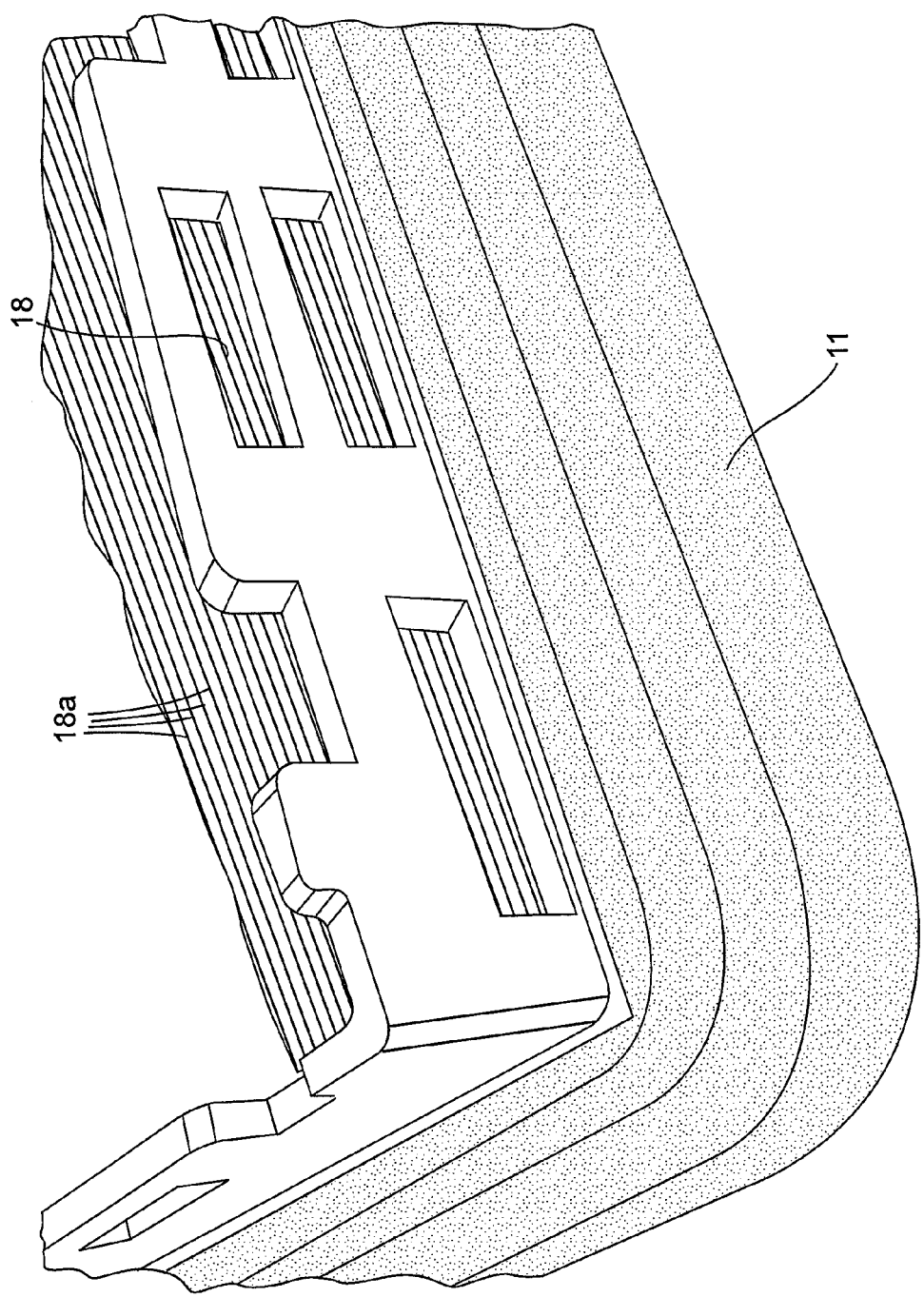
FIG. 6 is a close up view of the housing and filter element of the filter structure shown in FIG. 5.
Figure 7:
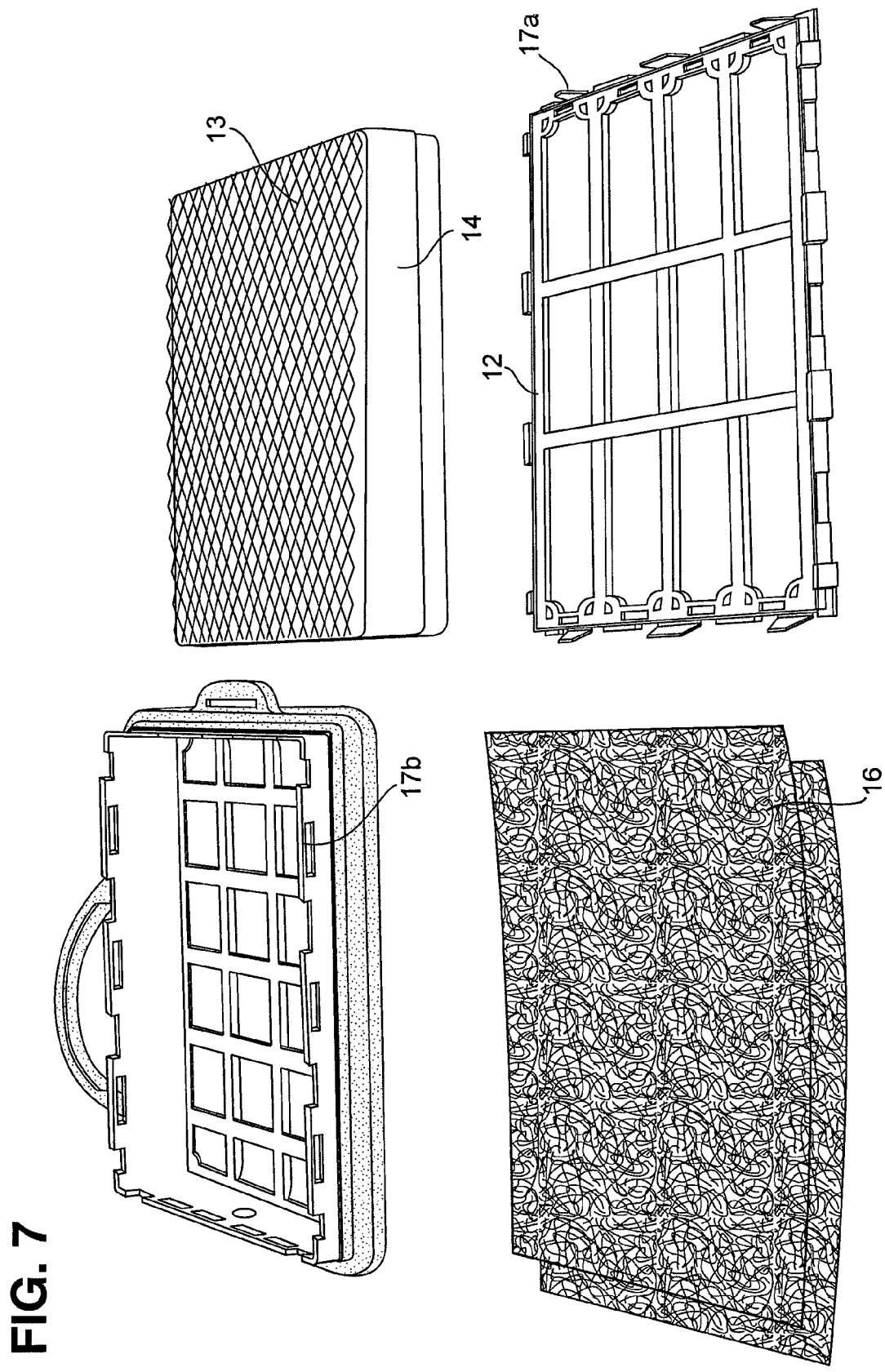
FIG. 7 is a different deconstructed view of the filter structure shown in FIGS. 1-4.

FIG. 5 is a deconstructed view of the filter structure 10 shown in FIGS. 1-4. Downstream side 12 of housing 11 has been removed, as has perforate support 13. Downstream filter media 14 is exposed and the multiple layers of filter element 18 are also visible. Also visible are the individual tab 17a and slot 17b of the tab-and-slot means of securing the filter element, shown as 17 in FIG. 4. FIG. 6 is a close up view of the housing 11 and filter element 18. Layers 18a are visible in the close up. FIG. 7 is a second deconstructed view of the filter structure 10. Downstream side 12 of housing 11 has been removed, as has perforate support 13 and downstream filter media 14. Visible are two layers of upstream filter media 16 and the tab 17a and slot 17b of the tab-and-slot means of securing the filter element, shown as 17 in FIG. 4.

EXAMPLE 4

The filter structures FStr-1, FStr-2, FStr-3, and FStr-CTRL were subjected to crankcase ventilation (CCV) testing by placing the filters in standard filter housings within the crank case of diesel engines having model number MX-US, obtained from the DAF Trucks N.V. of The Netherlands. The engines were run under standard operating conditions until the pressure drop across the filter structures was found to be between 2300 and 4200 Pa at 250 L/min at ambient temperature. Thus, FStr-CTRL was removed at 4200 Pa; FStr-1 was removed at 2300 Pa, FStr-2 was removed at 2300 Pa, and FStr-3 was removed at 3200 Pa.

The removed samples were purged of liquid oil and various individual layers were subsequently tested for permeability. Permeability was measured in cubic feet of air per minute, per square foot of filter surface area (cfm/ft$^2$). The direction the layers were removed was from upstream of the element moving downstream. The first 4 layers were removed then one layer at the following measured locations through the element: ⅛", ¼", ⅜", ½", ⅝", ¾" and ⅞". The last two layers were also removed.

Figure 8:
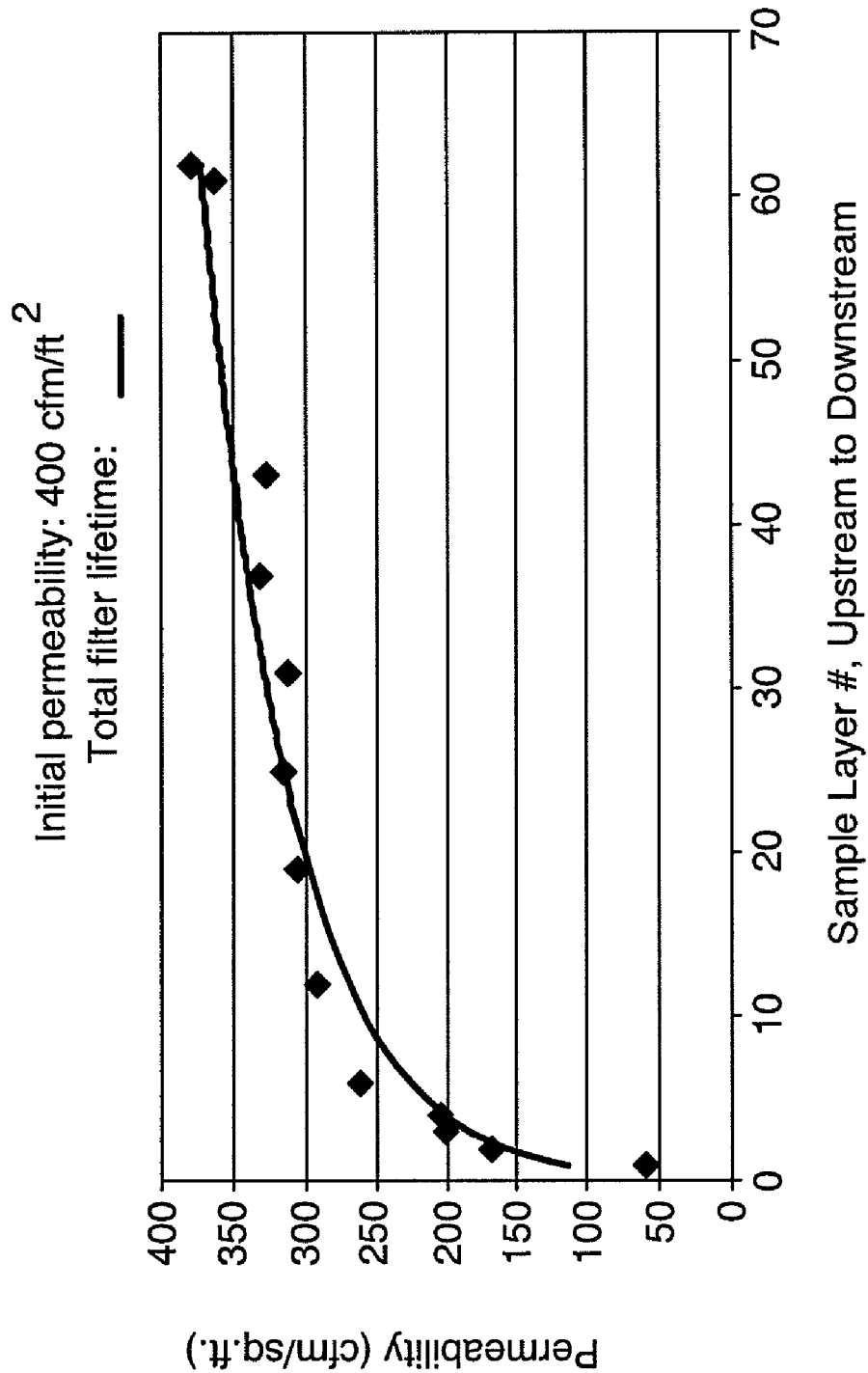
FIG. 8 is a plot showing the filtration efficiencies of several layers of a single filter media after being subjected to crank case filtration.

Each layer removed for testing was washed with hexane to remove oil, and dried, prior to permeability testing of the layer. The result of testing for FStr-CTRL is shown in FIG. 8. As compared to the initial permeability of FM-1 individual layers as 400 cfm/ft$^2$, the first upstream layer of this filter has a permeability of only about 60 cfm/ft$^2$. The next few layers have much higher permeability, 150 cfm/ft$^2$ and greater. By layer 12, the permeability is close to 300 cfm/ft$^2$. Thus, it is observed that the filter failure due to high pressure drop is actually due primarily to the first few layers. These layers trap the heavy soot loading present in the crank case and quickly become clogged.

Figure 9:
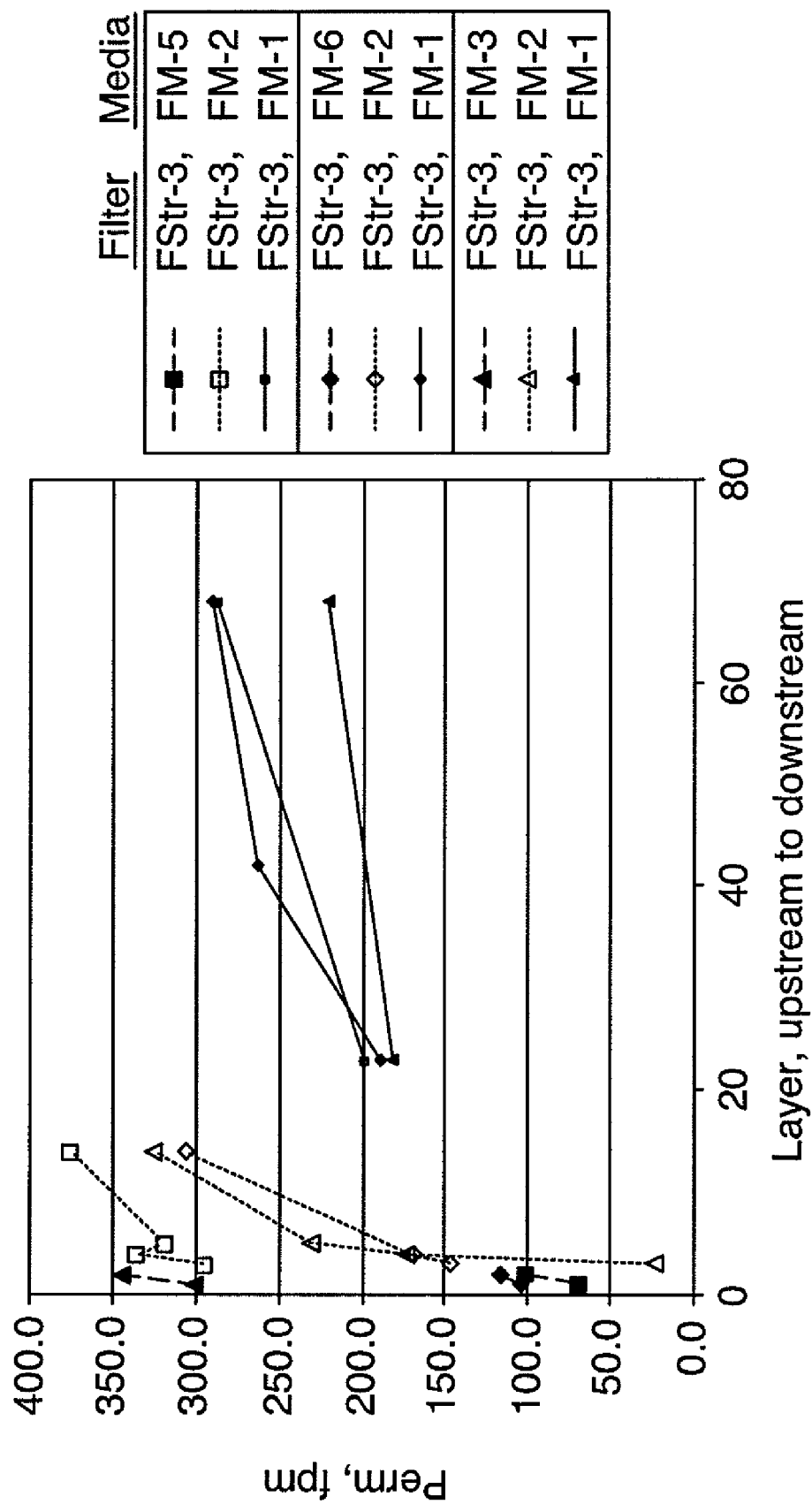
FIG. 9 is a plot showing the filtration efficiencies of several layers of a composite filter media of the invention after being subjected to crank case filtration.

Results of the same test, using FStr-1, FStr-2, and FStr-2 instead of FStr-CTRL, are shown in Table 4 and FIG. 9. In this test, the results are separated to reflect the filtration effect of the three sets of layers. Thus, if the permeability of the FM-1 or FM-2 layers remains high, the layer of air-laid media FM-3, FM-4, FM-4, or FM-5 is effectively removing soot prior to the crank case air stream reaching the FM-1 layers. However, if the high permeability of FM-1 and/or FM-2 is accompanied by low permeability of the air laid layers, then the air laid layers are entrapping too much soot in the initial upstream portion of the filter structure, resulting in early high overall pressure drop across the filter even as the air laid filter does a good job of protecting the FM-1 and FM-2 layers.

TABLE 4

Results of CCV testing of FStr-1, FStr-2, FStr-3, and FStr-CTRL

| Media | Filter Structure Number | Layer | Permeability, m/min @ 125 Pa | Total Hours of Use |
|---|---|---|---|---|
| FM-4 | FStr-2 | 1 | 68.4 | 117 |
| FM-4 | | 2 | 100.7 | |
| FM-2 | | 3 | 294.5 | |
| FM-2 | | 4 | 334.9 | |
| FM-2 | | 5 | 318.3 | |
| FM-2 | | 14 | 375.3 | |
| FM-1 | | 23 | 199.0 | |
| FM-1 | | 68 | 287.4 | |
| FM-3 | FStr-1 | 1 | 301.6 | 221 |
| FM-3 | | 2 | 344.4 | |
| FM-2 | | 3 | 24.2 | |
| FM-2 | | 4 | 172.9 | |
| FM-2 | | 5 | 230.9 | |
| FM-2 | | 14 | 325.4 | |
| FM-1 | | 23 | 181.2 | |
| FM-1 | | 68 | 220.2 | |
| FM-5 | FStr-3 | 1 | 103.6 | 171 |
| FM-5 | | 2 | 116.1 | |
| FM-2 | | 3 | 146.8 | |
| FM-2 | | 4 | 169.1 | |
| FM-2 | | 14 | 306.4 | |
| FM-1 | | 23 | 189.5 | |
| FM-1 | | 42 | 263.6 | |
| FM-1 | | 68 | 289.8 | |

Filter media FM-3 in FStr-1 does not protect the next layers of FM-2 as indicated by high permeability of FM-3 layers while low permeability developed in the first few layers of FM-2, particularly the first layer of FM-2. Decreased permeability is the result of soot captured in the media. Filter media FM-4 in FStr-2 do too good of a job by capturing excessive amounts of soot, resulting in low permeability of the FM-4 layers while protecting the layers of FM-2 such that high permeability was maintained. Filter media FM-5 in FStr-3 falls between the other two filter elements, effectively trapping soot particles without becoming clogged, while at the same time preventing clogging of the underlying filter media designed to filter oily aerosol from the blow-by stream.

While the invention has been described in connection with specific embodiments thereof, it will be understood that it is capable of further modifications and this application is intended to cover any variations, uses, or adaptations of the invention following, in general, the principles of the invention and including such departures from the present disclosure as come with known or customary practice within the art to which the invention pertains and as may be applied to the essential features hereinbefore set forth and as follows in scope of the appended claims.

We claim:

1. A filter element comprising a layered composite of nonwoven air laid and wet laid media, comprising at least three layers of a nonwoven filter media, the filter element comprising:
   (a) An upstream media comprising at least two media layers of a first filter medium that is an air laid medium, the medium comprising 1 to 100 wt % of a first fiber comprising a bicomponent fiber comprising a diameter of 5 to 50 microns, and 5 to 50 wt % of a second fiber, wherein the first filter medium has a pore size of 50 to 100 micrometers, a permeability of 50 to 800 ft-min$^{-1}$, a solidity of about 2 to 25% at 860 Pa, a basis weight of 150 to 350 g-m$^{-2}$, and a compressibility of greater than 0.7 between 860 Pa and 3860 Pa; and
   (b) at least two media layers of a filter medium that is a wet laid medium comprising a pore size of 4 to 200 micrometers, a permeability of 50 to 800 ft-min$^{-1}$, a solidity of about 2 to 25% at 860 Pa, a basis weight of 20 to 120 g-m$^{-2}$, and a compressibility of about 0.5 to 1.0 between 860 Pa and 3860 Pa,
   (c) at least two media layers of a filter medium that is a wet laid medium comprising a pore size of 4 to 200 micrometers, a permeability of 1 to 1000 ft-min$^{-1}$, a solidity of about 2 to 25% at 860 Pa, a basis weight of 20 to 120 g-m$^2$, and a compressibility of about 0.5 to 1 between 860 Pa and 3860 Pa,
wherein the filter element is capable of filtering both solid and liquid particulates from a heavily loaded fluid stream.

2. The filter element of claim 1 further comprising media layers on a support.

3. The filter element of claim 2 wherein the support comprises a housing.

4. The filter element of claim 2 wherein the support is perforate.

5. The filter element of claim 1 comprising layers of the first medium comprising a solidity of about 2 to 10% at 860 Pa.

6. The filter element of claim 1 comprising layers of the medium of part (b) or (c) independently comprising a pore size of 50 to 150 micrometers, a permeability of 50 to 800 ft-min$^{-1}$, a solidity of about 2 to 10% at 860 Pa and a compressibility of about 0.5 to 1 between 860 Pa and 3860 Pa.

7. The filter element of claim 1 comprising layers of a medium of part (b) or (c) independently comprising a pore size of 40 to 70 micrometers, a permeability of 350 to 650 ft-min$^{-1}$, a solidity of about 5 to 8% at 860 Pa and a compressibility of about 0.5 to 1 between 860 Pa and 3860 Pa.

8. The filter element of claim 7 comprising multiple layers of the filter medium of part (b) or (c).

9. The filter element of claim 1, wherein the solid particulate comprises smoke, soot, talc, asbestos, carbon, a solid nanoparticle, or combinations thereof.

10. The filter element of claim 9 wherein the solid particulate comprises soot.

11. The filter element of claim 1 wherein the liquid particulate comprises water, a fuel, an oil, a hydraulic fluid, an emulsion, an aerosols of a hydrophobic or a hydrophilic material, a volatile organic chemical, or combinations thereof.

12. The filter element of claim 11 wherein the liquid particulate comprises an oil.

13. The filter element of claim 1 wherein the liquid particulate coalesces on, and drains away from, the filter media.

14. The filter element of claim 1 wherein the fluid stream comprises air, industrial waste gases, crankcase gases, blow-by gases, nitrogen, helium, argon, or combinations thereof.

15. The filter element of claim 14 wherein the fluid stream comprises air.

16. The filter element of claim 1 comprising a gradient of pore sizes.

17. The filter element of claim 1 wherein the solid particulate is trapped substantially by the first filter medium and the liquid particulate is trapped by the filter medium of part (b) or (c).

18. The filter element of claim 1 wherein the second fiber comprises a glass.

19. The filter element of claim 1 wherein the second fiber comprises a polyester.

20. The filter element of claim 1 wherein the first filter media comprises a third fiber.

21. The filter element of claim 1 wherein the filter media (b) or (c) comprises a bicomponent fiber.

22. The filter element of claim 19 further comprising a glass fiber.

23. The filter element of claim 20 wherein the third fiber comprises a polyester fiber.

24. The filter element of claim 1 wherein the compressibility of the first element is greater than about 0.9 over a pressure differential of about 860 to about 3860 Pa.

25. The filter element of claim 1 wherein the permeability of the first filter medium is from about 140 to 460 ft-min$^{-1}$.

26. The filter element of claim 1 wherein the solidity of the first filter medium is from about 3 to 8% at 860 Pa.

27. The filter element of claim 1 wherein the bicomponent fiber of the first filter medium comprises a diameter of about 10 to 30 microns.

28. The filter element of claim 1 wherein the second fiber of the first filter medium comprises a diameter of about 0.1 to 50 microns.

29. The filter element of claim 1 wherein the second fiber of the first filter medium comprises a diameter of about 0.5 to 30 microns.

30. The filter element of claim 1 wherein the first filter medium comprises a thickness of about 0.05 to 22 millimeter at 860 Pa.

31. The filter element of claim 1 wherein the first filter medium comprises a thickness of about 0.5 to 11 millimeter at 860 Pa.

32. The filter element of claim 1 wherein the first filter medium comprises a thickness of about 1 to 5 millimeter at 860 Pa.

33. The filter medium of claim 1 wherein the first filter medium comprises a compressibility of about 0.7 to 1.0 between 860 Pa and 3860 Pa.

34. The filter element of claim 1 wherein the pore size of the filter medium (b) or (c) is about 4 to 200 microns.

35. The filter element of claim 1 wherein the pore size of the filter medium (b) or (c) is about 40 to 70 microns.

36. The filter element of claim 1 wherein the permeability of the filter medium (b) or (c) is from about 50 to 800 ft-min$^{-1}$.

37. The filter element of claim 1 wherein the permeability of the filter medium (b) or (c) is from about 350 to 650 ft-min$^{-1}$.

38. The filter element of claim 1 wherein the solidity of the filter medium (b) or (c) is from about 2 to 10% at 860 Pa.

39. The filter element of claim 1 wherein the solidity of the filter medium (b) or (c) is from about 5 to 8% at 860 Pa.

40. The filter element of claim 1 wherein the basis weight of the (b) or (c) filter medium is from about 30 to 50 g-m$^{-2}$.

41. The filter element of claim 1 wherein the filter medium (b) or (c) comprises a thickness of about 0.05 to 22 millimeter at 860 Pa.

42. The filter element of claim 1 wherein the filter medium (b) or (c) comprises a thickness of about 0.3 to 3.6 millimeter at 860 Pa.

43. The filter element of claim 1 wherein the filter medium (b) or (c) comprises a thickness of about 0.5 to 0.8 millimeter at 860 Pa.

44. The filter element of claim 1 wherein one or more filter media comprise a surface treatment agent selected from the group consisting of a silicone, a fluorochemical, an amphoteric molecule, or mixtures thereof.

* * * * *